United States Patent

Hira et al.

[11] Patent Number: 5,961,198
[45] Date of Patent: Oct. 5, 1999

[54] LIQUID CRYSTAL DISPLAY DEVICE AND METHOD OF MANUFACTURING BACKLIGHTING LIGHT GUIDE PANEL THEREFOR

[75] Inventors: Yasuo Hira; Hitoshi Taniguchi, both of Yokohama; Yuji Mori, Mobara; Yoshie Kodera, Chigasaki, all of Japan

[73] Assignee: Hitachi, Ltd., Tokyo, Japan

[21] Appl. No.: 08/791,513

[22] Filed: Jan. 30, 1997

[30] Foreign Application Priority Data

Feb. 2, 1996 [JP] Japan ................................. 8-017335

[51] Int. Cl.⁶ ............................. F21V 7/04; G02F 1/1335
[52] U.S. Cl. ................................. 362/31; 362/561; 349/65
[58] Field of Search ........................... 362/31, 32; 349/65

[56] References Cited

U.S. PATENT DOCUMENTS

| | | | |
|---|---|---|---|
| 5,079,675 | 1/1992 | Nakayama | 362/31 |
| 5,377,084 | 12/1994 | Kojima et al. | 362/31 |
| 5,386,347 | 1/1995 | Matsumoto | 362/31 |
| 5,396,406 | 3/1995 | Ketchpel | 362/31 |
| 5,408,387 | 4/1995 | Murase et al. | 362/31 |
| 5,408,388 | 4/1995 | Kobayashi et al. | 362/31 |
| 5,420,761 | 5/1995 | DuNah et al. | 362/31 |
| 5,450,292 | 9/1995 | Yokoyama et al. | 362/31 |
| 5,461,547 | 10/1995 | Ciupke et al. | 362/31 |
| 5,485,291 | 1/1996 | Qiao et al. | 362/31 |
| 5,485,354 | 1/1996 | Ciupke et al. | 362/31 |
| 5,521,796 | 5/1996 | Osakada et al. | 362/31 |
| 5,575,549 | 11/1996 | Ishikawa et al. | 362/31 |
| 5,584,556 | 12/1996 | Yokoyama et al. | 362/31 |
| 5,608,837 | 3/1997 | Tai et al. | 362/31 |
| 5,649,754 | 7/1997 | Matsumoto | 362/31 |

*Primary Examiner*—Stephen Husar
*Assistant Examiner*—Matthew J. Spark
*Attorney, Agent, or Firm*—Antonelli, Terry, Stout & Kraus, LLP

[57] ABSTRACT

A light guide panel and liquid crystal display device including a liquid crystal cell array, a light guide panel or plate disposed on a rear surface of the liquid crystal cell array, and a light source disposed at a lateral side of the light guide panel or plate. The light guide panel or plate has a light incident surface on which light rays emitted from the light source are incident, a light-transmissive surface through which the incident light rays exit the light guide panel or plate toward the liquid crystal cell array, and a plurality of reflecting slant portions for directing the incident light rays toward the light-transmissive surface, wherein the reflecting slant portions are constituted by convexes or concaves which are substantially rectangular in plan view and substantially trapezoidal in sectional view.

8 Claims, 18 Drawing Sheets

SPREAD ANGLE OF INCIDENT LIGHT RAYS α (deg)
(REFLECTION AT SIDE WALL OF SMALL CONVEX)

SPREAD ANGLE OF INCIDENT LIGHT RAYS α (deg)
(REFLECTION AT SIDE WALL OF SMALL CONVEX)

INJECTION MOLDING

LIQUID CRYSTAL DISPLAY DEVICE AND METHOD OF MANUFACTURING BACKLIGHTING LIGHT GUIDE PANEL THEREFOR

BACKGROUND OF THE INVENTION

The present invention relates to a liquid crystal display device and a method of manufacturing a backlighting light guide panel for the same.

In recent years, implementation of personal computers inclusive of so-called word processors in a small size has been promoted, and portable type personal computers known as lap-top type or notebook type computers are widely used. In such portable type personal computer, a liquid crystal device is commonly used as a display unit. In this conjunction, there is an increasing tendency for adopting color display in the portable type personal computers. In accompanying with such trend, a backlighting type display device is coming into wide use, in which a light source is disposed at a rear side of a liquid crystal display screen for lighting the whole display screen from the rear or back side. Needless to say, the backlighting light source for the color liquid crystal display device is required to emit light with high luminance. Besides, it is necessary to illuminate the display screen with uniform luminance over the whole planar surface thereof. Luminance of the backlighting can easily be increased by increasing that of the light source. However, taking into consideration the fact that the portable-type personal computer or word processor or the like are usually operated by using a battery or cell, limitation is necessarily imposed to the attempt for increasing the luminance of the light source. To say in another way, there has been proposed no effective method or measures for increasing the luminance of the liquid crystal display screen.

For having better understanding of the present invention, description will first be made in some detail of conventional liquid crystal display devices such as disclosed, for example, in JP-A-4-162002 and JP-A-6-67004. FIG. 3 shows a lateral source type backlighting device employed conventionally in the liquid crystal display device known heretofore. Referring to the figure, a lamp such as a cold-cathode discharge tube or a hot-cathode discharge tube is employed as a light source 1 which is disposed at and along one lateral side of a light guide plate (also known as optical waveguide plate) 2 which is made of a light-transmissive material, wherein a diffusing sheet 3 formed of a synthetic resin of milk-white color having a light scattering effect is mounted over a top surface of the light guide plate 2 with a view to uniformizing luminance of the backlight over the whole display screen. Additionally, there are disposed on the diffusing sheet 3 a first prism sheet 4 and a second prism sheet 5 for the purpose of enhancing axial luminance (luminance in the direction orthogonal to the display screen) of the display device by converging diffused light rays.

In addition, a light scattering layer 6 is deposited over a rear surface of the light guide plate 2 at a side opposite to the light exit side in order to scatter the light rays traveling through the light guide plate 2 in the direction toward the diffusing sheet 3. In this conjunction, the light scattering layer 6 is manufactured in a specific structure described below with the aim to further uniformize luminance distribution of the light rays exiting the light scattering layer 6.

FIG. 4 of the accompanying drawing shows a structure of the light scattering layer 6. As can be seen in this figure, the light scattering layer 6 is formed by a plurality of light scattering dots by depositing titanium oxide or the like over the rear surface of the light guide plate 2 by resorting to e.g. a printing technique. Parenthetically, it will readily be understood that the intensity of light emitted from the light source 1 becomes lower as the distance from the light source 1 increases. Accordingly, the light scattering dots of the light scattering layer 6 deposited over the bottom surface of the light guide plate 2 are so formed that the area of a given dot increases as the position of the given dot becomes more remote from the light source 1. Furthermore, a reflecting sheet 8 is disposed on a bottom surface of the light scattering layer 6, as can be seen in FIG. 3.

According to another proposal disclosed, for example, in JP-A-7-294745, grating grooves are formed in the bottom surface of the light guide.

As is apparent from the foregoing description, in the conventional backlighting devices for the liquid crystal display device known heretofore, light emitted from the light source 1 and introduced into the optical waveguide or light guide plate 2 undergoes scattering at the light scattering dots forming the light scattering layer 6 so that the scattered light rays can be reflected back again into the light guide plate 2 under the action of the reflecting sheet 8 to thereby illuminate the liquid crystal cell after transmission through the diffusing sheet 3 and the two prism sheets 4 and 5. It can readily be understood that the structure of the conventional backlighting optical waveguide or light guide panel for the liquid crystal display device is much complicated.

Besides, because the diffusing sheet 3 of a light absorbing material is disposed over the top surface of the light guide plate 2, the conventional liquid crystal display device suffers a drawback that the luminance of the liquid crystal display device becomes lower as a whole although nonuniform distribution of luminance can certainly be suppressed to some extent. In other words, with the structure of the conventional backlighting device, the attempt for increasing the luminance is incompatible with the attempt for uniformization of luminance distribution. To say in another way, it is impossible to meet simultaneously both requirements for increasing the luminance on one hand and for uniformizing the luminance distribution on the other hand. Furthermore, in the case of the conventional liquid crystal display device in which the grating grooves are provided in the light guide, the pattern of the grating grooves reflected to the light rays exiting the light guide panel will interfere with a regular pattern of elements such as that of liquid crystal cell constituting the liquid crystal display device, giving rise to a problem that moiré phenomenon makes appearance. In order to solve this problem, a sheet for diffusing the light rays has to be additionally provided, to another disadvantage.

Furthermore, with the structure of the conventional backlighting optical waveguide or light guide panel, difficulty is encountered in mounting fixedly and stationarily the reflecting sheet 8 because of difference in the thermal expansion coefficient between the light guide plate 2 and the reflecting sheet 8 due to heat transfer from the light source 1, resulting in variation in the distance between the reflecting sheet 8 and the rear or bottom surface of the light guide plate 2 due to vibration, thermal deformation or the like phenomena, which in turn brings about a problem that nonuniformness of luminance distribution is likely to occur due to variation in the light utilization efficiency, as brought about by invasion and deposition of dusts between the reflecting sheet 8 and the light guide plate 2.

SUMMARY OF THE INVENTION

In the light of the state of the art described above, it is an object of the present invention to provide a liquid crystal display device which is essentially immune to the problems of the conventional liquid crystal display devices described above and which can ensure increased luminance without need for increasing luminance of a light source.

It is also an object of the invention to provide a method of manufacturing a backlighting optical waveguide or light guide panel for the liquid crystal display device mentioned above.

In view of the above and other objects which will become apparent as the description proceeds, there is provided according to a general aspect of the present invention a liquid crystal display device including a light guide plate in which a plurality of reflecting slant portions constituted by a corresponding number of small convexes or small concaves are formed in a bottom surface for translating traveling directions of light rays incident on the light guide plate toward a light-transmissive surface at predetermined angles of the light guide plate. In a preferred mode for carrying out the invention, a reflecting film may be formed on the bottom surface along the reflecting slant portions. Alternatively, a reflecting sheet may be disposed below the bottom surface of the light guide plate. Further, in the case where the reflecting sheet is employed, a prism sheet formed with individual prism elements each having an appropriate vertex angle should preferably be provided on a top surface of the light guide plate so that the liquid crystal cell can be lighted with illuminating rays exiting the light guide plate with an optimal distribution of exit angles.

When the reflecting film is formed along the reflecting slant portions, sectional shape thereof is so determined that the light rays exit the light guide plate through the light-transmissive surface in such directions that luminance becomes highest in the direction perpendicular to the light-transmissive surface of the light guide plate.

On the other hand, unless the reflecting film is formed on the bottom surface of the light guide plate, the traveling directions of the incident light rays are translated primarily under the effect of total reflection within the light guide plate. In that case, sectional shape of the reflecting slant portions is so determined that the light rays exit the light guide plate through the light-transmissive surface in such directions that luminance becomes highest in the direction perpendicular to the light-transmissive surface of the light guide plate. By disposing the prism sheet on the top surface of the light guide plate in the manner described above, the vertex angle of the prism elements is so determined that the axial luminance, i.e., luminance emanating from the light guide plate in the orthogonal direction in which user views the liquid crystal display screen becomes highest.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

General Description

Figure 1:
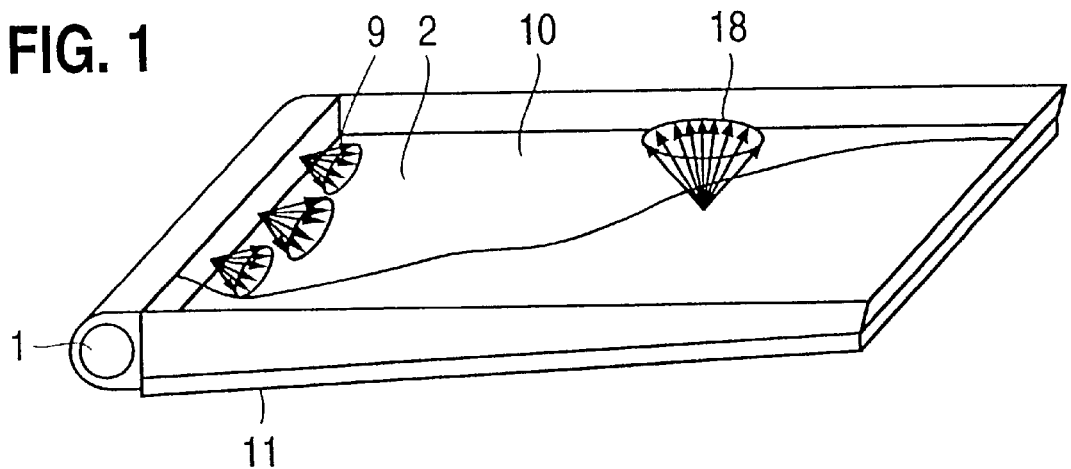
FIG. 1 is a perspective view showing a backlighting light guide panel for a liquid crystal display according to an embodiment of the present invention.

Before entering into detailed description of the preferred or exemplary embodiments of the present invention, general features thereof will first be described.

In Table 1 shown below, there are listed in summarization the data concerning inclination angle of the reflecting slant portions or dots constituted by convexes or concaves, height or depth, planar forms thereof, disposition of the reflecting slant portions or dots and density distribution thereof, and auxiliary data concerning important components of the light guide panel according to the invention.

TABLE 1

| REFLECTING FILM | PRESENT | ABSENT | EFFECTS |
|---|---|---|---|
| TYPES OF DOTS | SMALL CONVEX OR SMALL CONCAVE | SMALL CONVEX OR SMALL CONCAVE | — |
| INCLINATION ANGLE OF DOT VIEWED IN SECTION | $35 \pm 10°$ | $35 \pm 15°$ | OPTIMIZATION OF EXIT ANGLE |
| DEPTH OR HEIGHT OF DOT | SMALLER AS CLOSER TO LIGHT SOURCE 2 to 40 $\mu$m | | INCREASE OF LUMINANCE UNIFORMIZATION OF LUMINANCE DISTRIBUTION MOLDABILITY |
| SHAPE OF DOT | CIRCLE, OBLONG, etc. | SUBSTANTIALLY OBLONG, etc. | INCREASE OF LUMINANCE |
| DOT SIZE | DIAMETER $\leq \phi$ 200 $\mu$m IN CIRCULAR DOT SHORT SIDE LENGTH $\leq$ 200 $\mu$m IN OBLONG OR OTHER SHAPE | | PREVENTION OF VISUAL PERCEPTION OF DOTS |
| DOT DISPOSITION | AT RANDOM WHEN PLANAR DOT SHAPE IS OBLONG, LONG SIDES OF DOTS EXTEND SUBSTANTIALLY PARALLEL TO LIGHT SOURCE | | PREVENTION OF MOIRÉ OPTIMIZATION OF EXIT ANGLE |
| DOT DENSITY DISTRIBUTION | LOWER AS CLOSER TO LIGHT SOURCE | | UNIFORMIZATION OF LUMINANCE DISTRIBUTION |
| AUXILLIARY COMPONENTS | — | REFLECTING SHEET SPECIAL PRISM SHEET | INCREASE OF LUMINANCE OPTIMIZATION OF EXIT ANGLE |

The present invention may be carried out in a mode in which a reflecting film is formed on a rear or bottom surface of the light guide plate or a mode in which the reflecting film is not provided. The angle of inclination (also referred to as inclination angle) of the reflecting slant portion or dot constituted by a small convex or a small concave as viewed in section should preferably be selected in a range of 20° to 50° and more preferably in a range of 35±10°. In particular, in the backlighting light guide panel in which the reflecting film is provided, the inclination angle should be in a range of 35±10° while in the case of the backlighting light guide panel in which the reflecting film is not provided, the inclination angle within a range of 35±15° is preferred. By regulating the inclination angle of the dot in section to the ranges mentioned above, distribution of angles at which light rays traveling through the light guide plate exit the latter can be optimized and at the same time the axial luminance (i.e., luminance as viewed in the direction perpendicular to the light-transmissive surface or a coextensive plane of the backlighting light guide panel) can be increased while suppressing the quantity of light rays exiting obliquely the light guide plate.

The height or depth of the reflecting slant portion or dot should preferably be selected from a range of 2 to 40 $\mu$m. When the height or depth mentioned above is greater than 40 $\mu$m, luminance will become excessively high in a region close to a cold cathode-discharge tube employed as the light source, incurring ultimately nonuniformness of luminance or light intensity distribution. Besides, when the depth or height mentioned above is smaller than 40 $\mu$m, difficulty will be encountered in molding the light guide plate because then dot-like small convexes or small concaves formed in a stamper serving as a die become difficult to be filled or injected with a plastic material, making it difficult to form the reflecting slant portions or dots in a desired shape by the molding. On the other hand, in case the height or a depth of the reflecting slant portion or dot is smaller than 2 μm, then light reflection efficiency of the backlighting light guide panel will be degraded, making it difficult or impossible to ensure desired luminance or light intensity.

With regard to the top plan shape of the reflecting slant portion or dot (i.e., shape of the reflecting slant portion or dot when viewed perpendicularly to the light guide plate), it is preferred to form the reflecting slant portion or dot in the form of a circle or rectangle when the reflecting film is provided, although the dot may be implemented in other shapes without departing from the spirit of the invention. Parenthetically, with the expression "substantially in a rectangular form" or the like, it is contemplated that not only the intrinsically rectangle but also a shape approximating a trapezium is to be covered. In the backlighting light guide panel in which the reflecting film is not provided, the substantially rectangular form of the reflecting slant portion or dot (i.e., convex or concave) is preferred because the scattered light rays within the light guide plate can be suppressed with the luminance of the backlighting light guide panel being enhanced correspondingly.

When the shape of the reflecting slant portion or dot is of a circular form, the diameter thereof should preferably be shorter than 200 μm. On the other hand, in the case of the reflecting slant portion or dot of rectangular shape, the length of the short side thereof should preferably be shorter than 200 μm. If otherwise, the shape of the dots or reflecting slant portion of the light guide plate can visually be perceived by a user, making it difficult for the user to discriminatively identify characters and graphics to be visually identified. The lower limit of the size of the dot or reflecting slant portion should be limited to 10 μm. If otherwise, the number of dots increases too excessively to manufacture the backlighting light guide panel with ease.

The dots or reflecting slant portions should preferably be disposed at ransom. If otherwise, moiré phenomenon will make appearance due to interference of the dot array with other regular pattern such as of liquid crystal cells, color filter, TFT pattern (thin-film transistor pattern) and/or a black stripe array. When the dot or reflecting slant portion is essentially of a rectangular shape, the dots or reflecting slant portions should preferably be so disposed that long sides of the dots or reflecting slant portions extend substantially in parallel with the light source which may be constituted by a discharge tube as mentioned hereinbefore. In that case, optimization of the exit angle distribution can be realized more easily.

Distribution of the dots or reflecting slant portions should preferably be such that the dot density is lower at the location closer to the light source.

As the auxiliary members constituting the backlighting light guide panel for the liquid crystal display device according to the present invention, there may be mentioned a reflecting sheet and (or) a prism sheet employed in the backlighting light guide panel where the reflecting film is not provided. These auxiliary members should be provided in order to optimize luminance and exit angle of light rays exiting the light guide plate.

At this juncture, it should however be mentioned that the auxiliary elements such as the prism sheet, the diffusing sheet and others employed in the conventional backlighting light guide panel for the liquid crystal display device are effective for enhancing luminance and optimizing luminance distribution as well as the exit angles of the light rays, etc. regardless of presence or absence of the reflecting film.

Exemplary Embodiments

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "convex", "concave", "height", "depth" and the like are words of convenience and are not to be construed as limiting terms.

Figure 2:
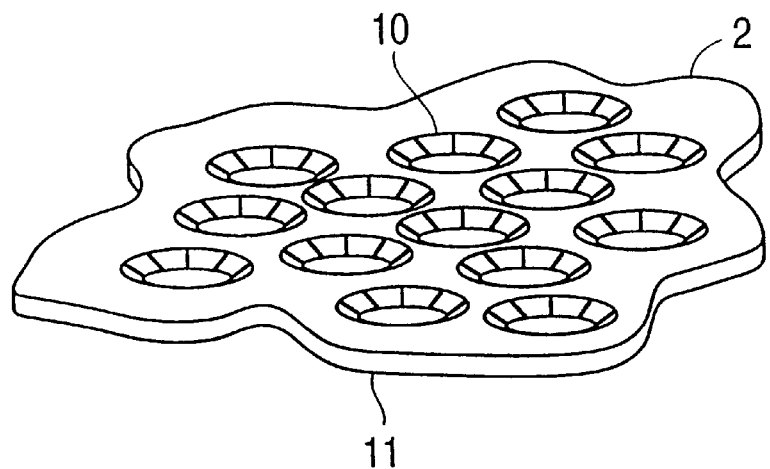
FIG. 2 is a fragmentary perspective view showing small convexes formed in a bottom surface of a light guide plate shown in FIG. 1.
Figure 3:
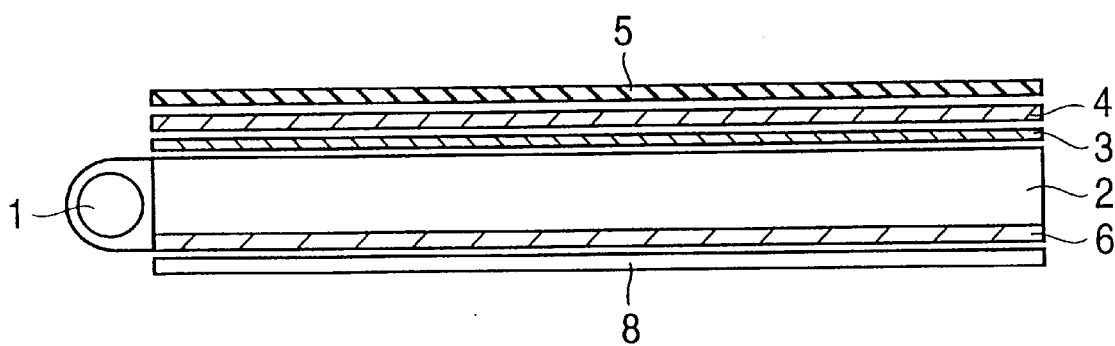
FIG. 3 is a view showing a backlighting light guide panel employed conventionally in a liquid crystal display device known heretofore.
Figure 4:
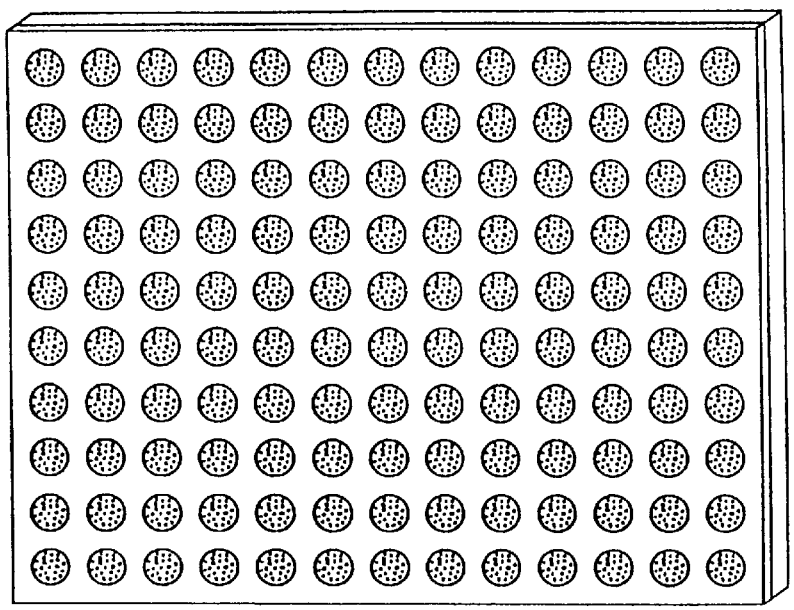
FIG. 4 is a schematic view for illustrating disposition of light scattering dots in a light scattering layer formed in the backlighting light guide panel shown in FIG. 3.

FIG. 1 is a perspective view showing a backlighting light guide panel used in a liquid crystal display device according to an embodiment of the present invention, and FIG. 2 is a fragmentary perspective view showing a reflection layer of the light guide plate 2 of FIG. 1. The backlighting light guide panel for the liquid crystal display device according to the instant embodiment of the invention includes as primary components at least a light source 1, a light guide plate 2 and a reflecting film 11 or a reflecting sheet 8 (not shown in FIGS. 1 and 2 but shown in FIG. 3). In the light guide plate 2, there are formed in a bottom or rear surface thereof a number of oblique reflecting surfaces (reflecting slant portions) 10 in the form of truncated cones (hereinafter also referred to as the small convexes 10), wherein the reflecting film 11 is formed along the small convexes 10. Basically, the reflecting slant portions or small convexes 10 may be disposed at random.

Figure 5:
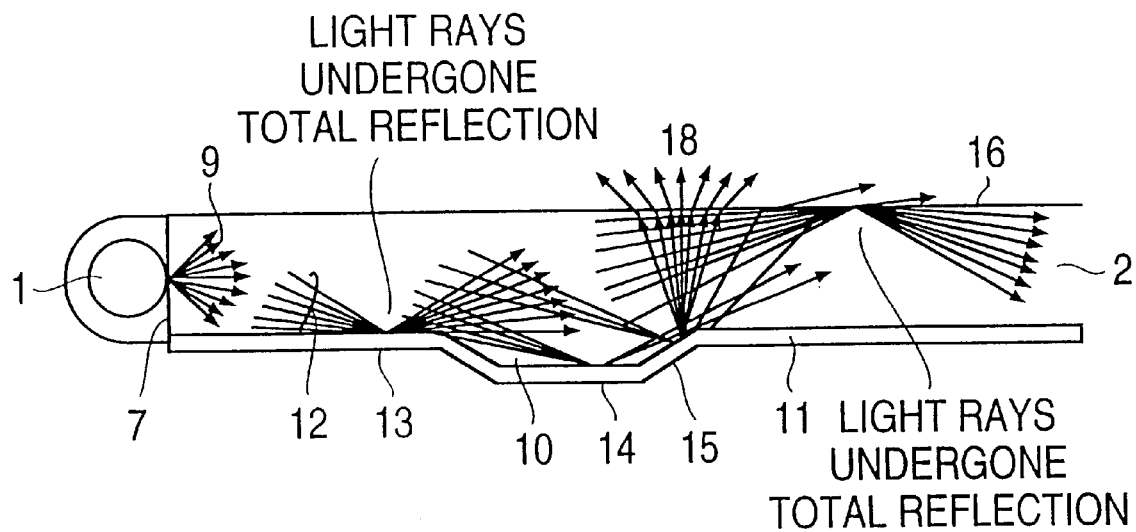
FIG. 5 is a schematic diagram for illustrating paths along which light rays incident on a light guide plate travel therethrough in the backlighting light guide panel shown in FIG. 1.

FIG. 5 is a schematic diagram for illustrating paths along which light rays emitted from the light source 1 travel through the light guide plate 2. Referring to FIG. 5, light rays emanating from the light source 1 are incident on a left-hand end face 7 of the light guide plate 2 as incident light rays 9 and travel through the light guide plate 2 as travelling light rays 12 which travel in the direction toward the other or right-hand end face of the light guide plate 2 while undergoing repetitionally total reflections at a bottom surface 13 of the light guide plate 2 and at a light-transmissive surface 16. Those of the traveling light rays 12 incident on slant surfaces 15 of the small convexes 10 (reflecting slant portions) are reflected toward the light-transmissive surface 16, whereon the light rays exist the light-transmissive surface 16 after refraction to enter the liquid crystal display device for the backlighting thereof. On the other hand, those of the traveling light rays 12 incident on the bottom surfaces 14 of the small convexes are reflected at the bottom surfaces 14, wherein some of the reflected light rays are again reflected at the slant surfaces 15 of the small convexes to travel in the direction toward the liquid crystal display device by way of the light-transmissive surface 16. Thus, by disposing the small convexes 10 and the reflecting film 11 in a proper pattern, the traveling light rays 12 are caused to exit progressively the light guide plate 2 for lighting the liquid crystal display cell.

Figure 6:
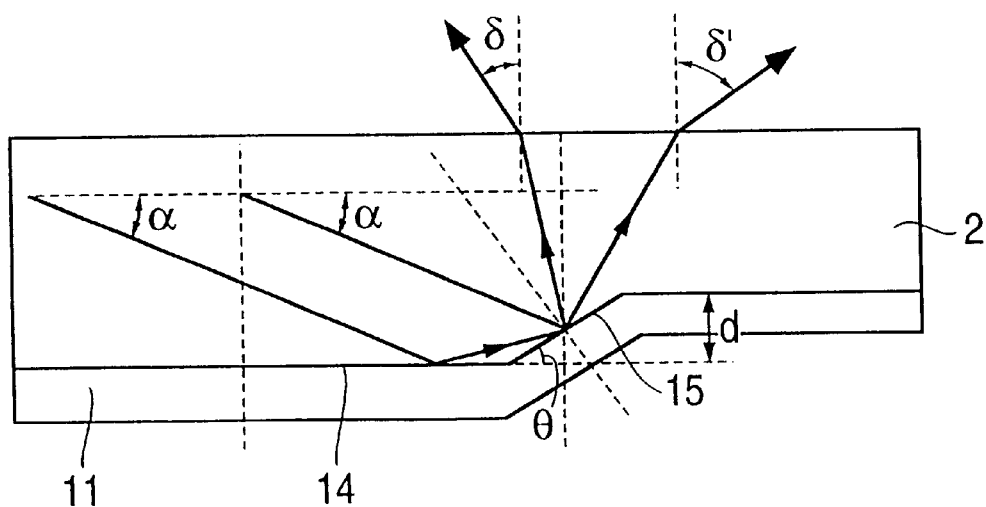
FIG. 6 is a schematic diagram for illustrating reflections of light rays at a reflecting slant portion or convex formed in the light guide plate.

FIG. 6 is a schematic diagram showing the paths followed by the light rays traveling through the light guide plate 2 and the reflected light rays for illustrating exit angles of the light rays exiting the light guide plate 2 to enter the liquid crystal display device. Referring to the figure, the spread angle α represents an angle at which the light rays emitted from the light source 1 impinge on the light guide plate 2. The spread angle α is determined by the angle of the left-hand end face 7 of the light guide plate 2 and the refractive index of the material forming the light guide plate 2. As can be seen from FIG. 6, the spread angle α is about ±40° in the case where the left-hand end face 7 of the light guide plate 2 is disposed at a right angle relative to the light-transmissive surface 16 and where the light guide plate 2 is formed of a conventional plastic material such as acrylic resin. Parenthetically, the light rays spreading at the spread angle α of minus values can not directly impinge onto the small convexes 10 for the geometrical reason. Further, in FIG. 6, reference symbol θ represents an angle of inclination (hereinafter also referred to as the inclination angle) of the small convex and d represents a height or depth of the small convex. Additionally, reference symbol δ represents an exit angle at which the light ray reflected at the slant surface 15 exits the light guide plate 2 while δ' represents an exit angle at which the light ray reflected at both the bottom surface 14 and the slant surface 15 of the small convex exits the light guide plate 2.

Figure 7:
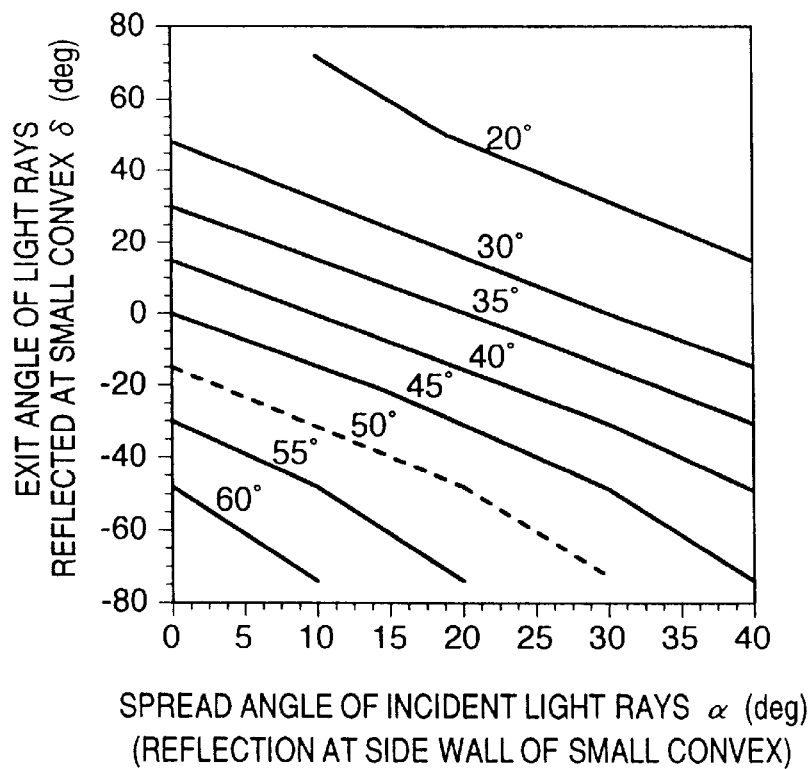
FIG. 7 is a view for illustrating graphically relations between a spread angle $\alpha$ of incident light rays and an exit angle $\delta$ of light ray reflected at a side wall of a convex.
Figure 8:
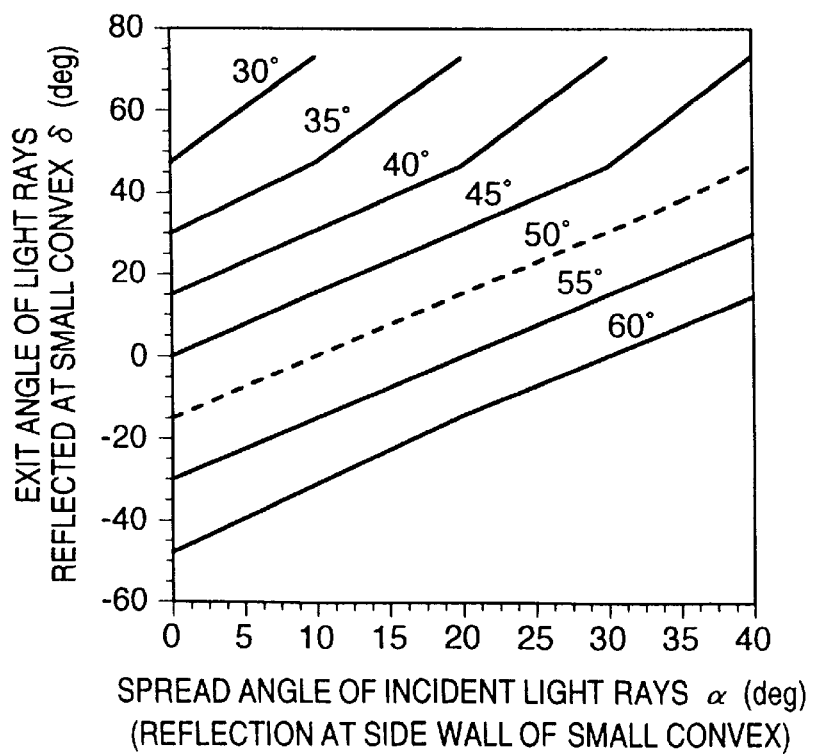
FIG. 8 is a view for illustrating graphically relations between the spread angle $\alpha$ and the exit angle $\delta$ of light ray reflected at a bottom wall of the convex.

FIG. 7 is a view for illustrating graphically relations between the spread angle α and the exit angle δ with the inclination angle θ being used as a parameter. In the figure, the exit angle δ having minus values indicate that the light rays reflected at the slant surface 15 exits the light guide plate 2 in the direction lefthand relative to the vertical orthogonal to the plane of the light-transmissive surface 16. As can be seen from FIG. 7, those of the traveling light rays which impinge onto the slant surfaces 15 of the small convexes exit the light guide plate 2 through the light-transmissive surface 16 with a certain angular distribution. By way of example, when the inclination angle θ is 35°, the exit angle δ is ±30°, which means that the light rays exit the light guide plate 2 through the light-transmissive surface 16 with a proper or pertinent angular distribution. Similarly, FIG. 8 is a view for illustrating graphically relations between the spread angle α and the exit angle δ with the inclination angle θ being used as a parameter. As can be seen from FIG. 8, the light rays exit the light guide plate 2 through the light-transmissive surface 16 with a given angular distribution. At this juncture, when the proper value of the inclination angle θ is so determined by reference to FIGS. 7 and 8 as to fall within a range of 20° to 60° and more preferably within a range of 35°±10°, the light rays exiting the light guide plate 2 can light the liquid crystal display device with proper or optimal angle(s).

As will now be understood from the above description, the backlighting light guide panel according to the invention can be constituted only by the light source 1 and the light guide plate 2 in comparison with the conventional backlighting light guide panel composed of the light source 1, the light guide plate 2, the diffusing sheet 3, the first prism sheet 4 and the second prism sheet 5 and the reflecting sheet 8. Thus, with the structure described above, luminance of the liquid crystal display device can be increased while allowing the backlighting light guide panel and hence the liquid crystal display device to be manufactured inexpensively with the process therefor being much simplified, to a great advantage over the conventional liquid crystal display device. Additionally, by virtue of the teaching of the invention incarnated in the backlighting light guide panel described above, there can be realized the liquid crystal display device which can be operated with stable characteristics without suffering variation of the light utilization efficiency and nonuniform distribution of luminance due to invasion and interposition of dusts between the reflecting sheet 8 and the light guide plate 2 as experienced in the case of the liquid crystal display device of the conventional structure.

Next, description will be made in detail of various geometries or shapes of the small convex 10 formed in the light guide plate 2.

Figure 9:
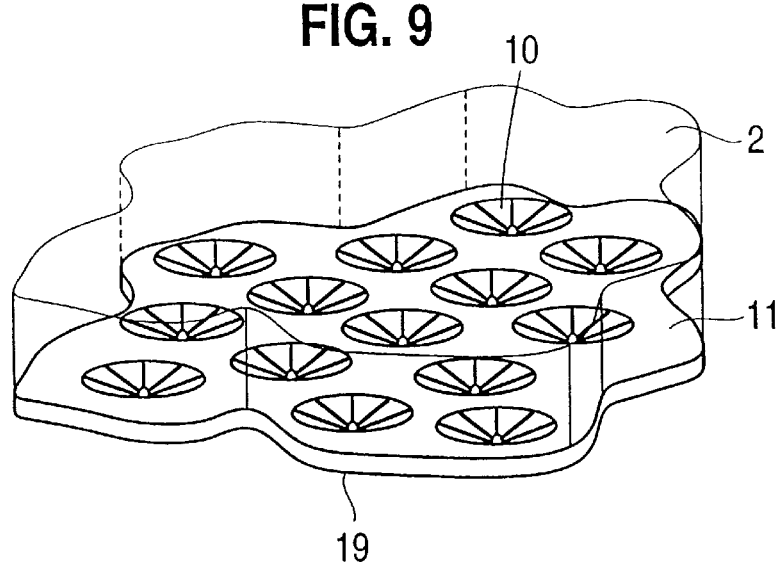
FIG. 9 is a fragmentary perspective view showing a structure of the light guide plate according to another embodiment of the invention.
Figure 10:
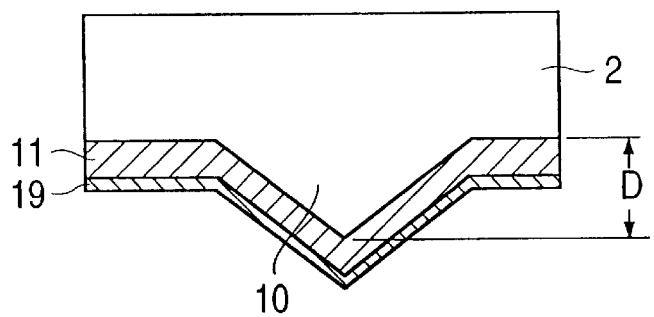
FIG. 10 is a partial sectional view showing a small convex formed in the light guide plate shown in FIG. 9.

FIG. 9 is a fragmentary perspective view of a light guide plate 2 according to another embodiment of the invention, and FIG. 10 is a partial sectional view of a small convex 10 formed in the light guide plate 2 shown in FIG. 9. In the light guide plate 2 according to the instant embodiment of the invention, each of the small convexes 10 is realized substantially in a conical shape, wherein a protection film 19 is additionally deposited over a bottom or rear surface of the reflecting film 11 for the purpose of protecting the reflecting film 11 from variation of the reflectivity in the course of time lapse as well as protecting the reflecting film 11 against physical injuries.

Figure 11:
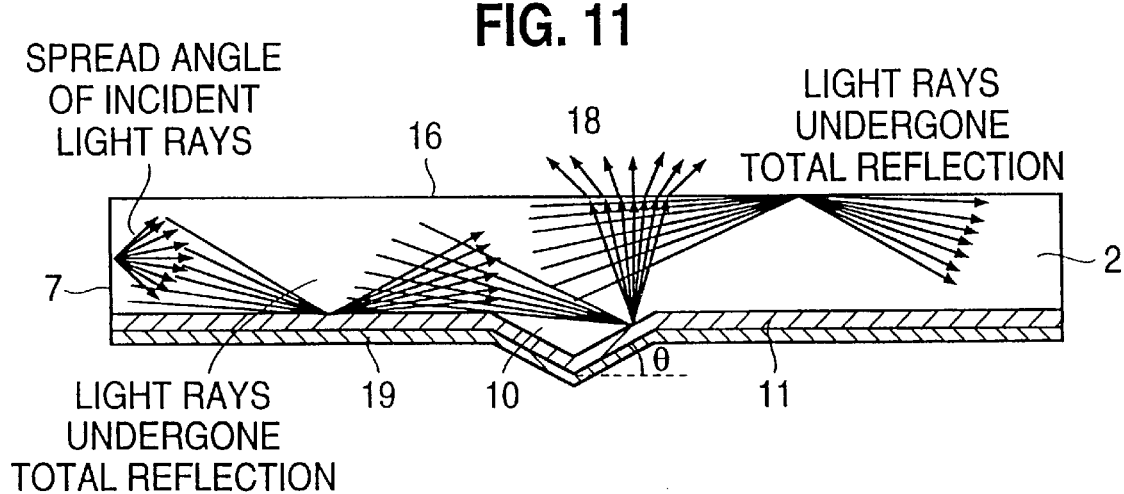
FIG. 11 is a schematic diagram for illustrating paths followed by light rays traveling through the light guide panel of the structure shown in FIG. 10.

FIG. 11 is a schematic diagram for illustrating paths followed by light rays traveling through the light guide plate 2 of the structure shown in FIG. 10. By forming the small convex 10 in the conical shape, the bottom surface 14 of the small convex is no more present in the light guide plate 2. Consequently, the traveling light rays reflected at the small convexes are limited to those reflected at the slant surfaces thereof, whereby the light rays exit the light guide plate 2 through the light-transmissive surface 16 in accordance with the relations illustrated in FIG. 7. With the structure of the light guide plate 2 described above, distribution of the exit angles of the light rays for backlighting the liquid crystal display device can be controlled appropriately.

FIGS. 12(a) to FIG. 12(e) are views for illustrating geometries or shapes of small convexes 10 according to further exemplary embodiments, respectively, of the invention.

Figure 12A:
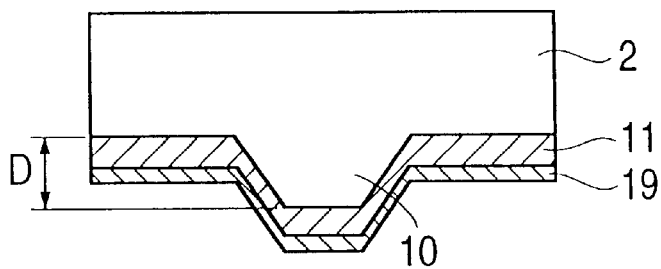
FIGS. 12($a$) to 12($e$) are views for illustrating geometries or shapes of small convexes formed in light guide plates as reflecting slant portions according to exemplary embodiments of the invention, respectively.

More specifically, shown in FIG. 12(a) is a structure of a light guide plate 2 provided with small convexes 10 each of a trapezoidal shape in section with a protection film 19 being formed over a rear surface of the reflecting film 11 according to another embodiment of the invention.

Figure 12B:
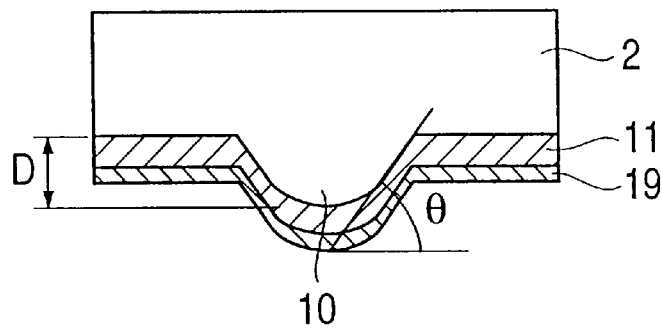

FIG. 12(b) shows a structure of the light guide plate 2 provided with small convexes 10 each of a trapezoidal shape in section with edge portions thereof being rounded smoothly. The geometrical configuration of the small convex 10 shown in FIG. 12(b) is preferred when variance in the conditions for fabricating actually the light guide plate 2 is taken into consideration. Besides, the rounded edges of the small convex is advantageous for close or intimate deposition of the reflecting film 11. Parenthetically, the inclination angle θ mentioned hereinbefore is so defined as illustrated in FIG. 12(b).

Figure 12C:
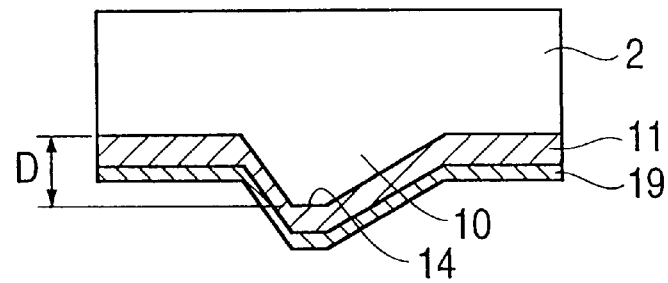

FIG. 12(c) shows a structure of the light guide plate 2 according to yet another embodiment of the invention in which small convexes 10 each of an asymmetrical trapezoidal shape in section are formed. The structure of the light guide plate 2 according to the instant embodiment is advantageous in that reflection of the traveling light rays at the bottom surface 14 is difficult to take place notwithstanding of presence of the bottom surface 14 in the small convex 10.

Figure 12D:
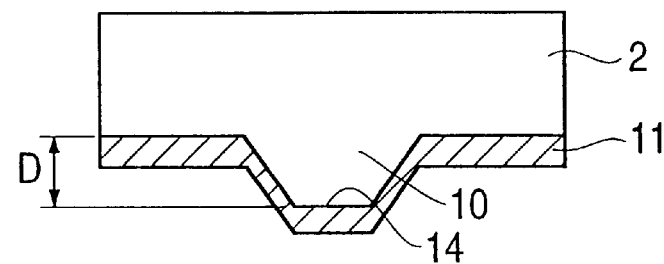

FIG. 12(d) shows a structure of the light guide plate 2 according to still another embodiment of the invention in which the area of the bottom surface 14 and of the small convex 10 is reduced. With this structure of the light guide plate 2, reflection of the light rays traveling through the light guide plate 2 at the bottom surface 14 is difficult to take place as in the case of the light guide structure shown in FIG. 12(c).

Figure 12E:
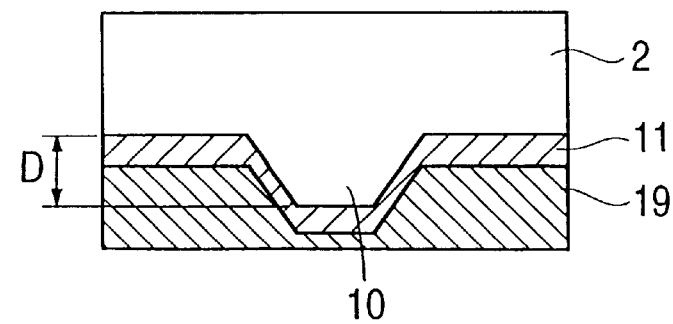
Figure 13A:
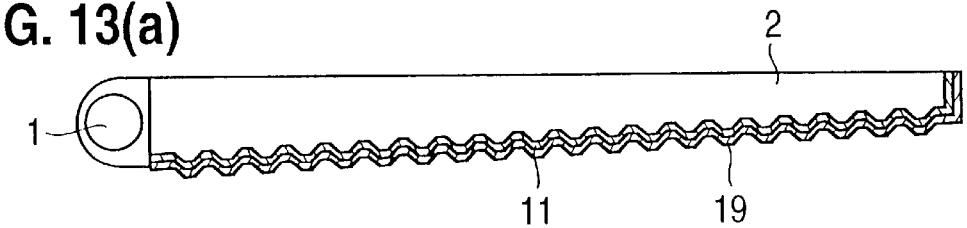
FIGS. 13($a$) to 13($f$) are views showing backlighting light guide panels according to six other embodiments of the invention, respectively.
Figure 13B:
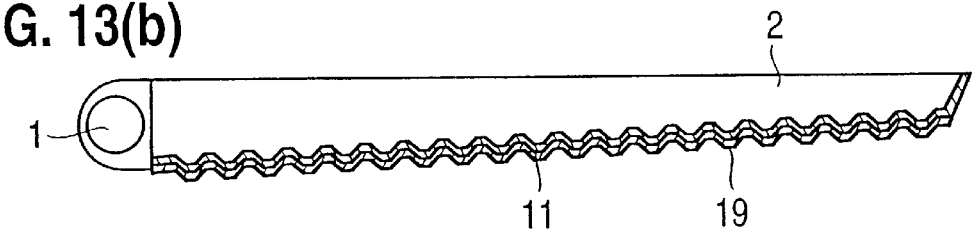
Figure 13C:
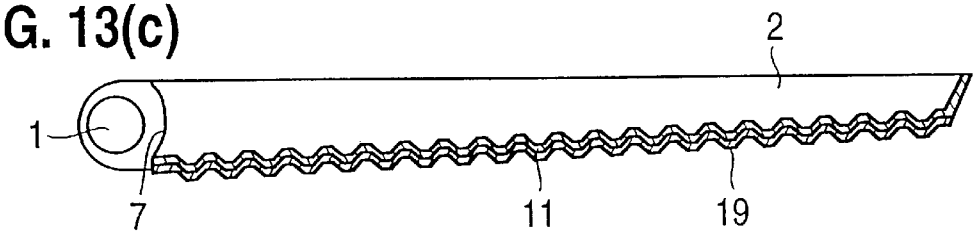
Figure 13D:
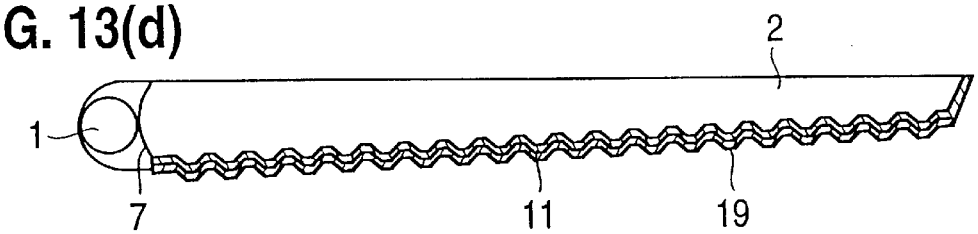
Figure 13E:
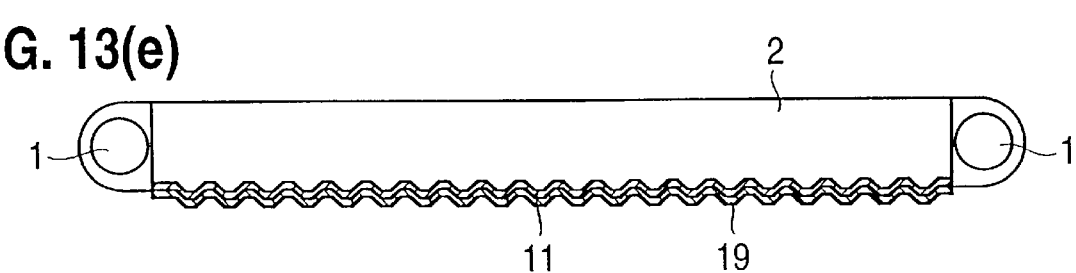
Figure 13F:
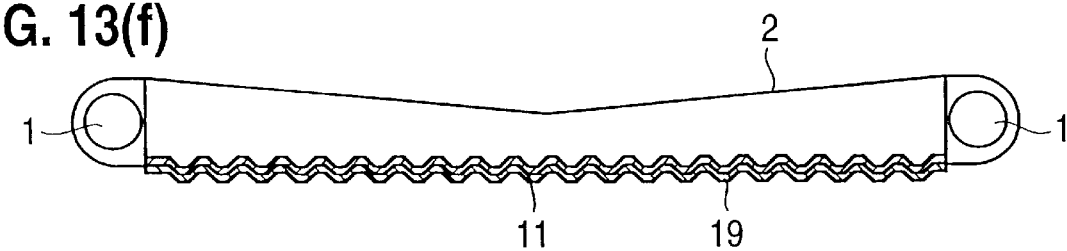

FIG. 12(e) shows a structure of the light guide plate 2 according to a further exemplary embodiment of the invention, in which a thick protection film 19 is provided. In practical applications, by thickening the protection film 19, process for forming it such as spin coating, roll coating or the like can be facilitated, whereby the processing efficiency can be enhanced.

In conjunction with the light guide plate shown in FIG. 12(*b*), it should be added that the smooth rounding of the edge portions is not restricted to the convex having a trapezoidal shape in section but can equally be applied to convexes of other sectional forms.

In order to realize the reflection of the traveling light at the small convexes 10, more than half the number of the small convexes 10 should preferably be formed with a height greater than 1 $\mu$m and more preferably greater than 5 $\mu$m, the reason for which can be explained by the fact that with a smaller height of the small convexes 10, not only the intensity of reflected light becomes lower but also the traveling light rays become more likely to be scattered, as in the case of a light guide plate 2 having roughened bottom surface.

For the same reason, the size of the small convexes 10 should preferably be so selected that more than half the number of the small convexes 10 have a size greater than 1 $\mu$m.

As numerical examples of the size and the height of a small convex 10 of an inverted-conical shape in section as shown in FIGS. 10 and 11, the diameter should preferably be about 50 $\mu$m with the inclination angle $\theta$ being about 35° while the height D is about 18 $\mu$m. Of course, the present invention is never restricted to the numerical values mentioned above.

Intensity of light emitted from the light source 1 and traveling through the light guide plate 2 becomes lower as the distance from the light source 1 increases. Accordingly, the density, the height and/or the size of the small convexes 10 should be so changed as a function of the distance from the light source 1 that the intensity distribute of the light rays reflected at the small convexes 10 and hence luminance distribution are uniformized over the whole top surface of the light guide plate 2. In this respect, it is taught according to the present invention that in the backlighting light guide panel provided with a single light source, the small convexes 10 are so formed that the density thereof increases in accordance with an exponential function or a power function in the direction toward the opposite end face of the light guide plate 2 located in opposition to the end face 7 at which the light source 1 is disposed. However, when the reflection of light at the opposite end face of the light guide plate 2 is taken into consideration, the density of the convexes should be decreased as the opposite end face of the light guide plate 2 becomes closer in the region near that end face in order to enhance luminance uniformization.

Next, preferred or exemplary structures of the backlighting light guide panel for the liquid crystal display device according to the present invention will be described.

FIG. 13(*a*) shows in a sectional view a single-source type backlighting light guide panel of a wedge-like form according to an embodiment of the invention. As can be seen in FIG. 13(*a*), the light guide plate 2 features that the thickness thereof is decreased progressively in proportion to the distance from the light source 1. With this structure of the backlighting light guide panel, the intensity distribution of the light rays exiting the light guide plate 2 can be uniformized, to an advantage. Additionally, thickness of the planar backlighting light guide panel as well as weight thereof can be decreased.

FIG. 13(*b*) shows a modification of the single-source type backlighting light guide panel shown in FIG. 13(*a*) and differs from the latter in that the opposite end face of the backlighting light guide panel (i.e., the end face located in opposition to the end face at which the light source 1 is disposed) is slanted so that those of the traveling light rays which do not leave the light guide plate 2 through the light-transmissive surface 16 but arrive at the opposite end face of the backlighting light guide panel are caused to change the traveling directions. Thus, with the structure of the backlighting light guide panel shown in FIG. 13(*b*), the light rays injected into the backlighting light guide panel can leave the same more easily, whereby uniformization of the intensity distribution of the light rays exiting the backlighting light guide panel can easily be enhanced with loss of light being lowered.

FIG. 13(*c*) shows a structure of the backlighting light guide panel in which the end face 7 at which the light source 1 is disposed is so shaped as to present a concave surface with a view to adjusting the spread angle $\alpha$ of the light rays incident onto the lefthand end face 7. This structure of the light guide plate 2 is effective for controlling the distribution of angles at which the traveling light rays leave the light guide plate 2. On the other hand, in the case of the structure shown in FIG. 13(*d*), the end face 7 is imparted with a convex surface. With this structure of the light guide plate 2, substantially same effect as that of the structure shown in FIG. 13(*a*) can be obtained.

FIG. 13(*e*) shows a structure of a two-source type backlighting light guide panel in which a light guide plate 2 of a uniform thickness is employed.

FIG. 13(*f*) shows another structure of the two-source type backlighting light guide panel in which the thickness of the light guide plate 2 is changed in order to cancel out non-uniformness of luminance distribution as brought about by difference in the distance from the light source 1.

At this juncture, it should be added that the structure of the backlighting light guide panel is never limited to those enumerated above. Modifications such as combinations of the illustrated structures may readily occur to those skilled in the art without departing from the spirit and scope of the invention.

Description will now turn to the backlighting light guide panel according to other embodiments of the present invention.

Figure 14:
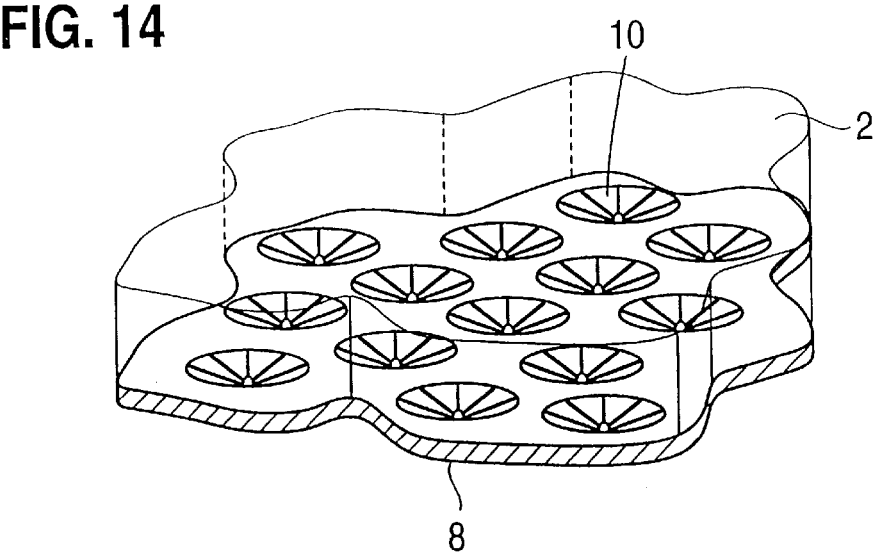
FIG. 14 is a view showing partially a backlighting light guide panel employed in a liquid crystal display device according to another embodiment of the invention.
Figure 15:
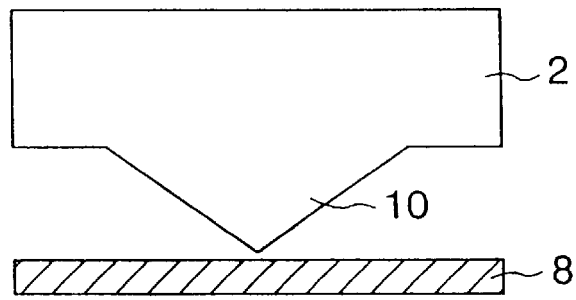
FIG. 15 illustrates a positional relationship between a small convex and a reflecting sheet in the backlighting light guide panel shown in FIG. 14.

FIGS. 14 and 15 are views showing partially a backlighting light guide panel according to another embodiment of the invention. The backlighting light guide panel according to the instant embodiment differs from the backlighting light guide panel described hereinbefore by reference to FIGS. 2 and 5 in that a reflecting sheet 8 is disposed in place of the reflecting film 11. As the reflecting sheet 8, a sheet of white color may preferably be employed for increasing the reflectivity. Parenthetically, FIG. 15 illustrates a positional relationship between a small convex 10 and the reflecting sheet 8. Although the small convex 10 is shown as having an inverted conical shape in section, it goes without saying that the small convex 10 may be formed in a truncated-conical shape or truncated pyramidal shape.

Figure 16:
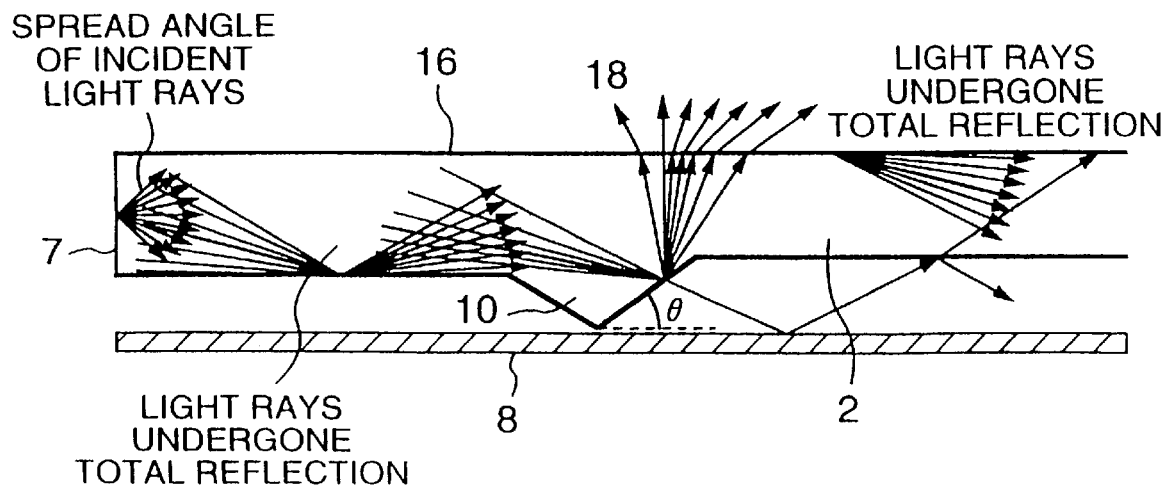
FIG. 16 is a schematic diagram for illustrating paths followed by light rays traveling through the light guide plate shown in FIGS. 14 and 15.
Figure 17A:
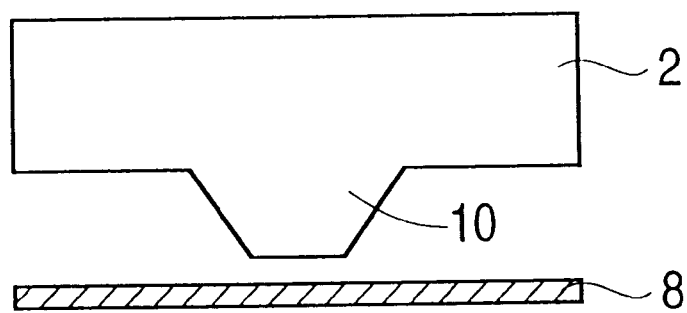
FIGS. 17($a$) to 17($d$) are sectional views showing sectional shapes of small convexes according to four other embodiments of the invention, respectively.
Figure 17B:
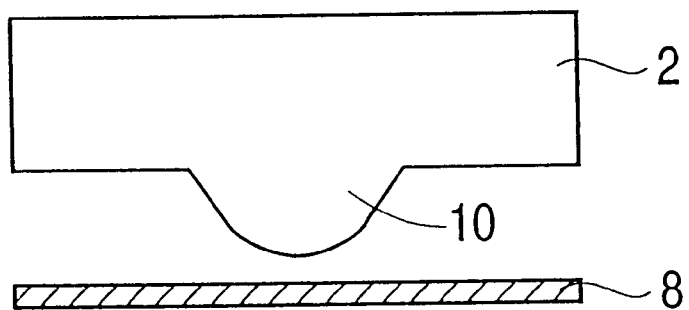
Figure 17C:
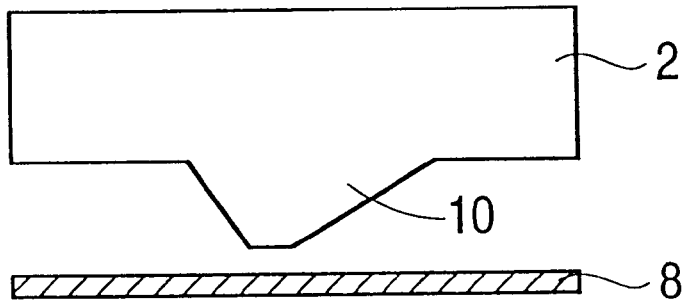
Figure 17D:
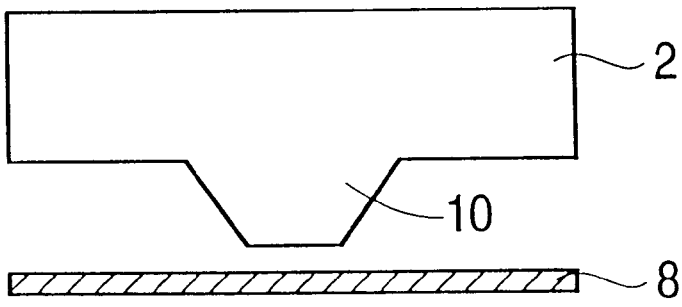

FIG. 16 is a schematic diagram illustrating the paths followed by light rays injected into the backlighting light guide panel. As can be seen in the figure, the light rays reflected at the reflecting sheet 8 enter again the light guide plate 2 to leave the light guide plate 2 from the top surface thereof after the traveling directions of the light rays having been changed due to reflections internally of the light guide plate 2 and at the reflecting sheet 8. The liquid crystal display device not shown is lighted from the back or rear side thereof by the light rays exiting the backlighting light guide panel.

FIGS. 17(a) to 17(d) are sectional views showing shapes of the small convex 10 and correspond to FIGS. 12(a) to 12(d), respectively, except for the difference that the reflecting sheet 8 is disposed at the bottom side of the light guide plate 2. With the structures of the backlighting light guide panel shown in FIGS. 17(a) to 17(d), there can be realized the liquid crystal display devices which can enjoy the advantages mentioned hereinbefore.

Figure 18:
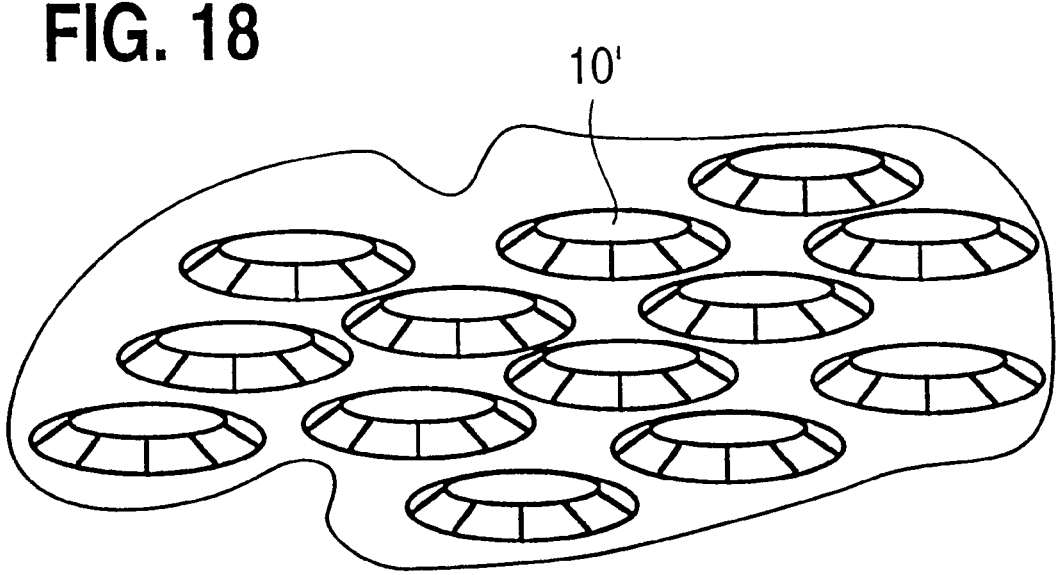
FIG. 18 is a perspective view showing partially a light guide plate for a liquid crystal display device according to a further embodiment of the present invention.

FIG. 18 is a perspective view showing a backlighting light guide panel according to a further embodiment of the present invention in which small concaves are formed in the bottom surface of the light guide plate 2 to serve as reflecting slant surfaces (reflecting slant portion). In the figure, small concaves are denoted by reference numeral 10'.

The small concave 10' can serve for changing the traveling directions of the light rays injected into the light guide plate 2 as in the case of the small convex 10 described previously. However, the small concave 10' can bring about advantageous effects over the small convex 10 as mentioned below.

(1) For a given number and a given size of the dots, the effect for changing the traveling directions of the light rays is significant when compared with the light guide plate 2 provided with the small convexes.

(2) When the light guide plate 2 is made of acrylic resin or the like by injection molding, the light guide plate 2 provided with the small concave 10' can be manufactured with a higher yield when compared with the light guide plate 2 formed with the small convexes 10.

Figure 19:
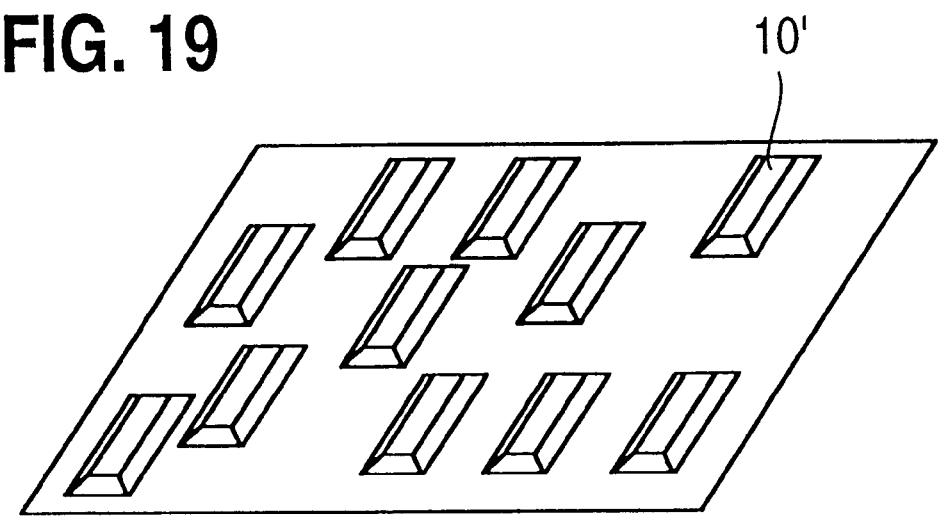
FIG. 19 is a perspective view showing a structure of a light guide plate employed in a backlighting light guide panel for a liquid crystal display device according to yet another embodiment of the invention.
Figures 20A, 20B, 20C:
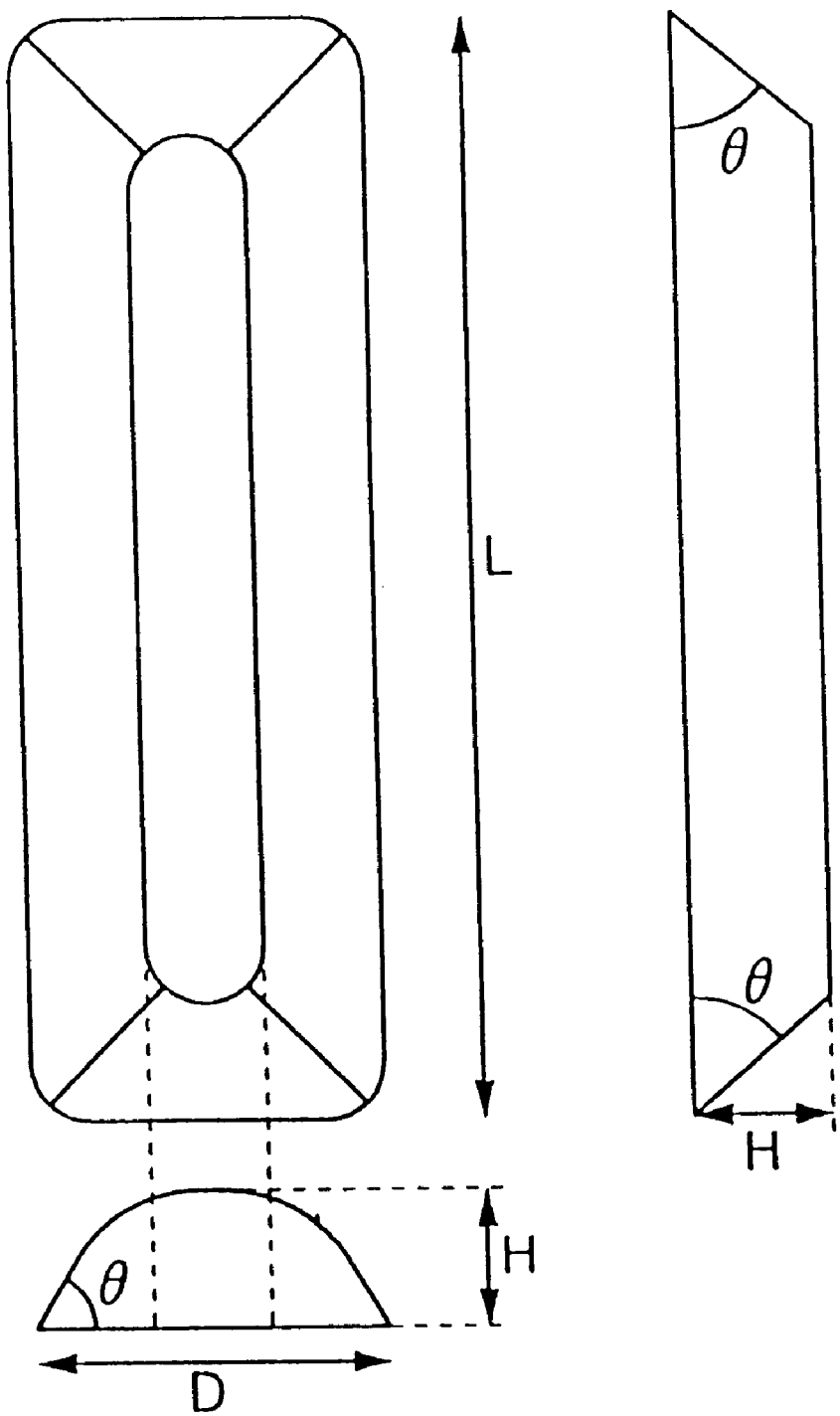
FIG. 20($a$) is a plan view for illustrating geometrical factors of a small convex of substantially rectangular shape formed in the light guide plate shown in FIG. 19 and FIGS. 20($b$) and 20($c$) are side views along the short and long sides of rectangular shape, respectively.
Figure 21A:
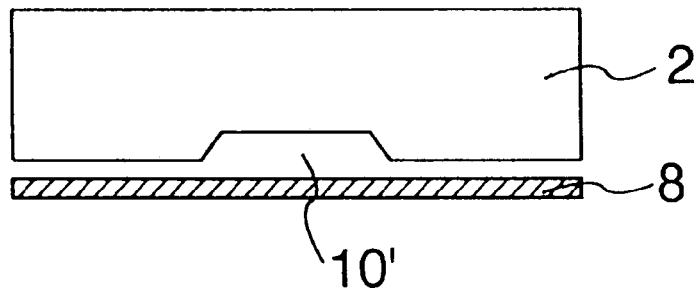
FIGS. 21($a$) to 21($c$) are view for illustrating three exemplary sectional shapes of a small concave formed in the light guide plate shown in FIG. 19.
Figure 21B:
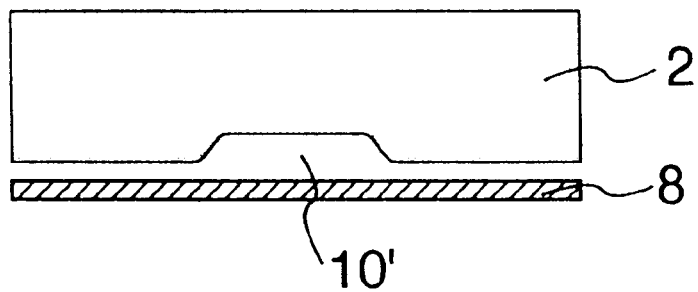
Figure 21C:
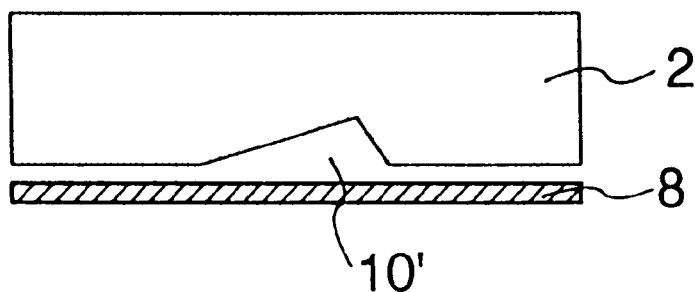
Figure 22:
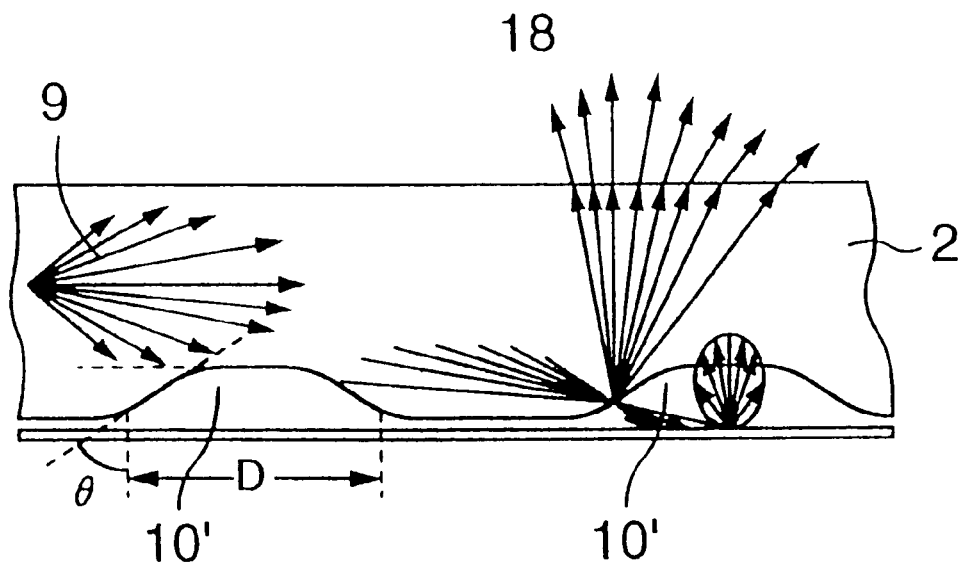
FIG. 22 is a schematic diagram for illustrating paths followed by light rays traveling through a light guide plate shown in FIG. 21($b$)
Figure 23:
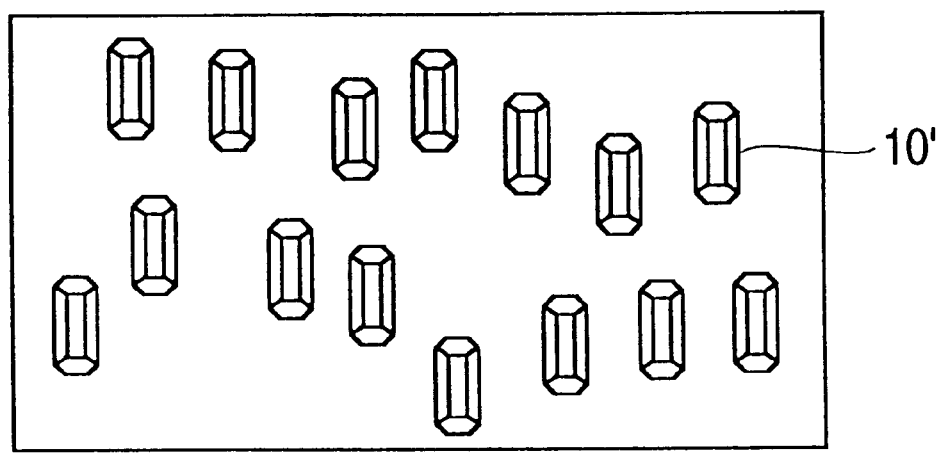
FIG. 23 is a top plan view showing an array of dots or small concaves formed in a light guide plate according to an embodiment of the invention.

As to the geometrical configuration, it is preferred to implement the small concave 10' in the form of rectangular pyramid, as shown in FIGS. 19 and 20. In this conjunction, the inclination angle θ of the small concave 10' (see FIGS. 20(a)–20(c)) should preferably be 35±15° and more preferably 35±10° with the height H thereof being preferably in a range of 2 to 40 μm, similarly to those of the small convex 10, as indicated in the Table 1. FIG. 21 shows three exemplary sectional shapes of the small concave 10'. Further, FIG. 22 is a schematic diagram for illustrating paths followed by the light rays traveling through the light guide plate 2 formed with the small concaves 10'. Furthermore, FIG. 23 is a top plan view showing an array of the small concaves 10' formed at random.

As can be seen in FIG. 22, the light rays impinging onto the light guide plate 2 undergo reflection at lateral or side surfaces of the small concaves 10' to be thereby converted to light rays effective for the backlighting.

Now, description will be directed to proper or optimal size and shape of the small convex and the small concave.

In both of the small convex 10 and the small concave 10' implemented substantially in a square form, the length of one side should preferably be shorter than 200 μm, while in the small convex 10 and small concave 10' having a circular contour, the maximum diameter should preferably be shorter than 200 μm and more preferably shorter than 100 μm, whereas in the case of the small convex 10 and the small concave 10' formed in a rectangular or oblong shape, the length of the short side should preferably be longer than 20 μm and more preferably longer than 100 μm, the reason for which can be explained as follows. Namely, when the small convex 10 and small concave 10' are formed in sizes greater than the values mentioned above, the small convexes 10 as well as the small concaves 10' forming bright spots, respectively, in the backlighting can visually be discriminated from one another when the liquid crystal device panel is viewed with a short distance from the eyes of user, providing thus disturbance to the user in discriminatively identifying the characters, pictures or the like visible data displayed on the liquid crystal display screen.

On the other hand, with regards to the minimum size of the small convex 10 and the small concave 10' formed substantially in a square form, the length of one side should be longer than 10 μm, while in the small convex 10 and the small concave 10' formed in a circular shape, the diameter should preferably be longer than 10 μm. In the case of the small convex 10 and the small concave 10' of a rectangular shape, the length of the short side should preferably be longer than 10 μm. When the small convex 10 as well as the small concave 10' is formed in a smaller size than those mentioned above, an extremely large number of dots have to be formed over the whole bottom surface of the light guide plate 2, as a result of which troublesome processes are required for forming the dots with reasonable accuracy.

Figure 24:
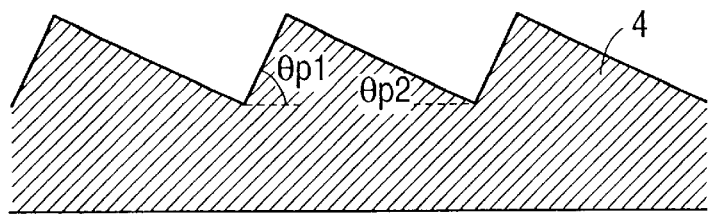
FIG. 24 is a fragmentary sectional view showing a structure of a prism sheet which can be used in a backlighting light guide panel according to another embodiment of the invention.
Figure 25:
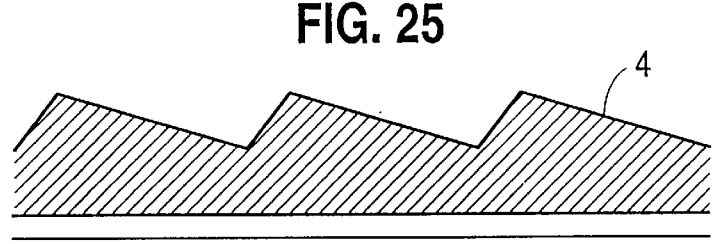
FIG. 25 is a partial sectional view showing a structure of a backlighting light guide panel according to a further embodiment of the invention.
Figure 25:
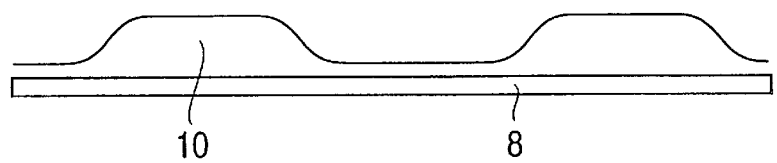

FIG. 24 is a fragmentary sectional view showing a structure of the prism sheet 4 which is effective for use in combination with a light guide plate formed with small concaves. Further, FIG. 25 is a schematic sectional view showing a structure of the backlighting device including a combination of the light guide plate 2 formed with the small concave 10', the reflecting sheet 8 and the prism sheet 4. Referring to FIG. 24, the prism sheet 4 should preferably be so formed that vertex angles θp1 and θp2 shown in FIG. 24 fall in the ranges of 80 to 88° and 20 to 24°, respectively, when the inclination angle θ of the small concave 10' is 35±15° or preferably 35±10° in order to maximize the intensity of light rays exiting the light guide plate 2 in the direction perpendicular to the top plane of the backlighting light guide panel.

Figure 26A:
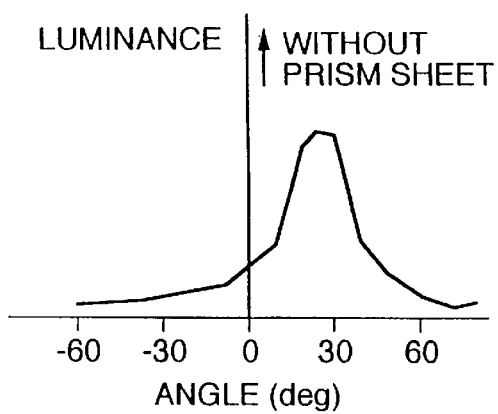
FIGS. 26(a) and 26(b) are views for illustrating graphically luminance characteristics of the backlighting light guide panel shown in FIG. 25.
Figure 26B:
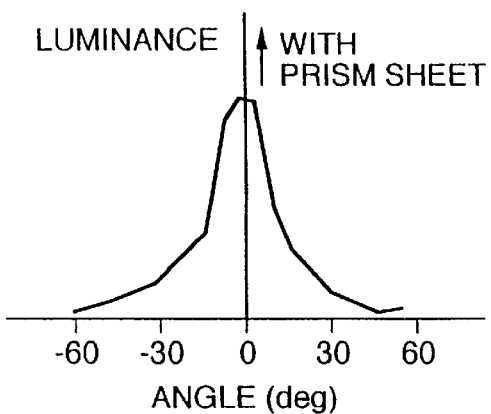

Referring to FIG. 25 and assuming that the backlighting light guide panel is not provided with the prism sheet 4, the light rays having high intensity will exit the light guide plate 2 in the direction oblique to the vertical drawn perpendicularly to the top plane of the light guide plate 2 (i.e., in the oblique direction righthand as viewed in FIG. 25) due to the reflections at the small concaves 10'. In this case, the exit angle and the intensity or luminance will bear such a relation as graphically illustrated in FIG. 26(a). By contrast, when the prism sheet 4 is disposed as shown in FIG. 25, intensity of the light rays exiting the backlighting light guide panel through the prism sheet 4 in the direction orthogonal to the top plane of the light guide plate 2 is increased because of refraction of the light rays exiting the light guide plate 2 obliquely by the prisms formed in the prism sheet 4. In that case, relation between the intensity of the light rays and the exit angle will be such as illustrated in FIG. 26(b). In other words, with the structure shown in FIG. 25, there can be realized a backlighting light guide panel in which the light scattering phenomenon can effectively be suppressed to ensure a high axial luminance. At this juncture, it should also be mentioned that the vertex angles θp1 and θp2 of the prism sheet 4 can be optimized in consideration of the inclination angle θ of the small concave 10'.

Next, description will be made of a method of manufacturing a light guide plate used in the backlighting light guide panel for the liquid crystal display device according to an embodiment of the present invention.

In general, for manufacturing the light guide plate, a metallic mold is fabricated, whereupon the light guide plate is manufactured by a plastic molding process by using the metallic mold. As a method of fabricating the metallic mold, there may be adopted various machining processes such as, for example, drilling, cutting, grinding and the like. Further, an electric-discharge process is also effective to this end. However, taking into account the fact that the reflecting slant surfaces implemented in the form of the small convexes 10 or the small concaves 10' according to the teachings of the invention will generally amount to an erroneous number for the light guide plate as a whole, i.e., 200 to 20,000/cm$^2$, manufacturing methods described below should preferably be adopted.

FIGS. 27(a) to 27(f) show processing steps in a method of manufacturing a light guide plate 2 according to an embodiment of the invention.

Figure 27A:
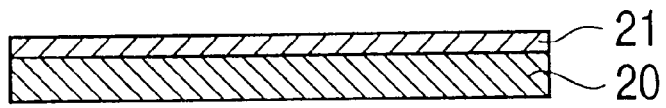
FIGS. 27(a) to 27(f) are views for illustrating processing steps in a method of manufacturing a light guide plate according to an embodiment of the invention.
Figure 27B:
Figure 27C:
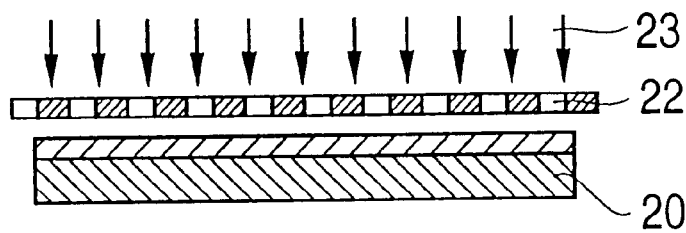
Figure 27D:
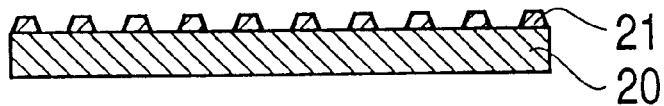
Figure 27E:
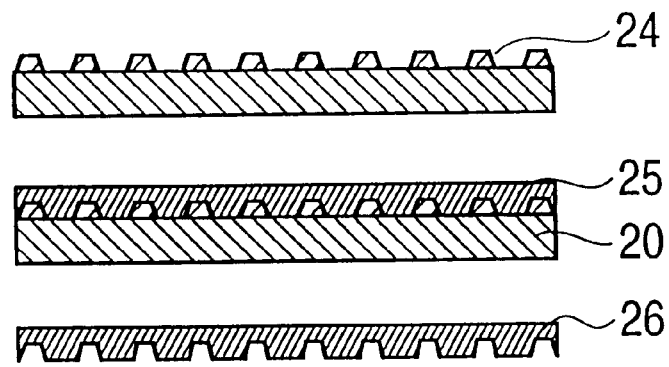
Figure 27F:
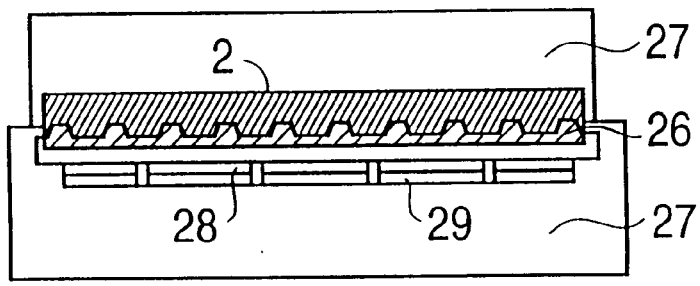

Referring to the figures, the manufacturing method now under consideration includes the following steps:

(1) step of forming a photoresist film 21 on a substrate 20, as shown in FIG. 27(a), (2) step of disposing a photo mask 22 having an reversal pattern of small convexes 10 (see FIG. 27(b)) on the substrate 20, as illustrated in FIG. 27(c), illuminating with ultraviolet rays 23 from above the photo mask 22 and then developing the photoresist film 21 to thereby form the reversal pattern of the small convexes 10 on the substrate 20, as illustrated in FIG. 27(d), (3) step of forming a metal-plating layer 25 over the photoresist film 21 to thereby form a stamper 26 for plastic molding from the metal-plating layer 25, as illustrated in FIG. 27(e), and (4) step of forming the light guide plate 2 through the plastic molding process by using the stamper 26.

As the substrate 20, there can be used a glass plate polished to a mirror quality and having a thickness of 2 to 10 mm. Before forming the photoresist film 21, an adhesion promoting agent of silane series may be applied. As the photo-resist material, a liquid or film-like positive or negative photo-resist material can be used. As a process for forming the photo-resist film, there may be mentioned a spin coating process, a roll coating process or the like. By controlling the thickness of the photoresist film 21, it is possible to variably adjust the height of the small convexes 10. Besides, the reflection or inclination angle of the small convex 10 can be controlled by regulating appropriately the exposure and/or developing conditions. As the photo mask 22, a chrome mask, a film mask or an emulsion mask can be used. The pattern of the small convexes 10 may be realized by using an electron beam, a laser beam or the like on the basis of previously prepared data concerning the sizes, number, distribution and other parameters of the small convexes 10. Before forming the metal-plating layer 25, an electrically conductive film 24 should preferably be formed in order to facilitate realization of the metal-plating layer 25 and hence the stamper 26 of high quality without suffering any unevenness in the plating. As the materials for the electrically conductive film 24 and the metal-plating layer 25, various metals can be used. However, nickel (Ni) is most preferred in view of uniformness and mechanical properties of the metal-plating layer 25. The metal-plating layer 25 as formed can be physically delaminated from the metal-plating layer 25 without difficulty and used as the stamper 26 after the polishing process, if it is required.

The stamper 26 finished in this way is then fixedly secured to a matrix 27 of e.g. an injection molding machine by means of a magnet 28 and a vacuum chuck 29. In the foregoing, it has been assumed that the injection molding process is adopted for manufacturing the light guide plate 2. However, the invention is never restricted to the injection molding. It is equally possible to manufacture the light guide plate 2 by resorting to an extrusion molding, a compression molding, a vacuum molding or the like.

As the material for forming the light guide plate 2, transparent plastic materials in general can be used. As such plastic materials, there may be mentioned plastics of acrylic resin series, polycarbonate resin, polyacetal resin, polyurethane series resin and plastic materials curable under irradiation of ultraviolet rays. Among them, the acryl-series materials are preferred for carrying out the invention in view of transparency, cost and moldability.

As a method of forming the reflecting film 11 over the surface of the light guide plate which is formed with the small convexes 10, there may be adopted a vacuum evaporation process, a spin coating process and a roll coating process. Of these processes, however, the vacuum evaporation process such as resistive heating or sputtering, CVD (chemical vapor deposition) or the like is suited for carrying out the invention. As the material for forming the reflecting film 11, there may be used various metal films and electrically conductive films. However, in view of the manufacturing cost and the reflectivity, the reflecting film 11 of aluminum is suited. In the course of vacuum evaporation process, the reflecting film 11 may be formed on the lateral or side surfaces of the light guide plate 2. Accordingly, it goes without saying that the end face 7 of the light guide plate 2 at which light is introduced from the light source 1 has to be covered with a film or the like for preventing the reflecting film 11 from being formed over the end face 7.

As the protection film 19, a variety of plastic films can be used. As typical ones of such plastics, there may be mentioned paraffin-series waxes and resins curable under irradiation of ultraviolet rays. Of the materials mentioned above, hot melt type wax of paraffin series is preferred for forming the protection film 19 by resorting to the roll coating process or the like.

Figure 28A:
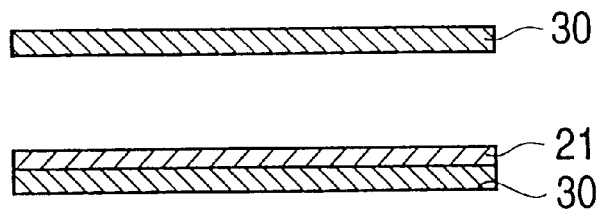
FIGS. 28(a) to 28(e) are views for illustrating a method of manufacturing a light guide plate according to another embodiment of the present invention.
Figure 28B:
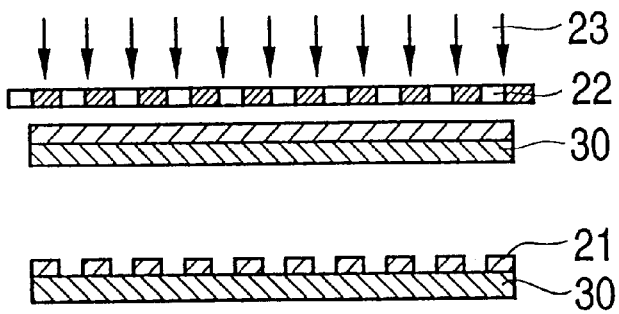
Figure 28C:
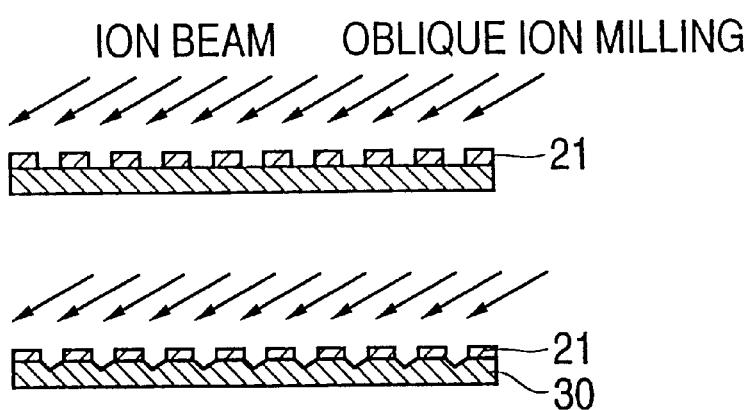
Figure 28D:
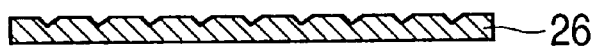
Figure 28E:
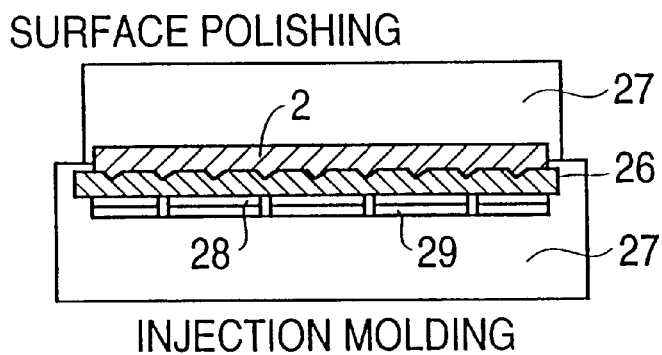

FIGS. 28(a) to 28(e) are views for illustrating a method of manufacturing a light guide plate 2 according to another embodiment of the present invention. The manufacturing method now under consideration includes processing steps mentioned below:

(1) step of forming a photoresist film 21 over a stamper substrate 30, as illustrated in FIG. 28(a), (2) step of depositing on the stamper substrate 30 a photo mask 22 formed with a pattern of small convexes to thereby form the pattern of small convexes on the stamper substrate 30 by irradiation with ultraviolet rays 23 from above the photo mask 22 and development, as illustrated in FIG. 28(b), (3) step of forming a stamper by etching the stamper substrate 30 with the reversal pattern 21 being used as the mask, as illustrated in FIG. 28(c), (4) step of removing the residual of the photoresist film (pattern 21), to thereby form the stamper 26, and (5) plastic molding stop carried out by using the stamper 26.

The manufacturing method mentioned above differs from the method illustrated in FIGS. 27(a) to 27(f) in that the stamper 26 is formed straightforwardly without resorting to the plating process. The stamper substrate 30 may be formed of a metal plate such as of nickel (Ni) or the like polished to the mirror grade. As the process for etching the stamper substrate 30, there may be adopted various dry etching processes in addition to the wet etching process. Among them, an ion milling process is preferred because of capability of controlling the reflection angles of the small convexes 10 by impinging an ion beam at desired angles.

Incidentally, it should be mentioned that conventional die material may be used for forming the metallic dies mentioned above in place of the stamper substrate 30.

FIGS. 29(a) to 29(e) are process flow charts showing a method of manufacturing a light guide plate 2 according to a still another embodiment of the present invention.

The manufacturing method now under consideration includes the steps mentioned below.

Figure 29A:
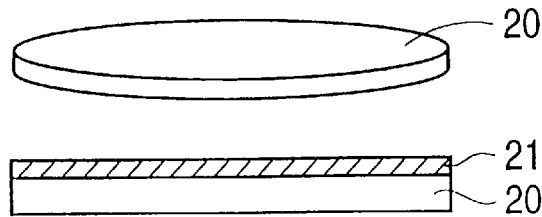
FIGS. 29(a) to 29(e) are process diagrams showing a method of manufacturing a light guide plate according to a still another embodiment of the present invention.
Figure 29B:
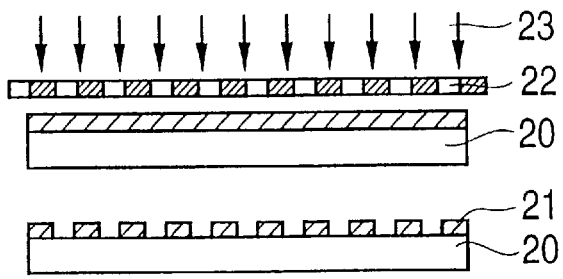
Figure 29C:
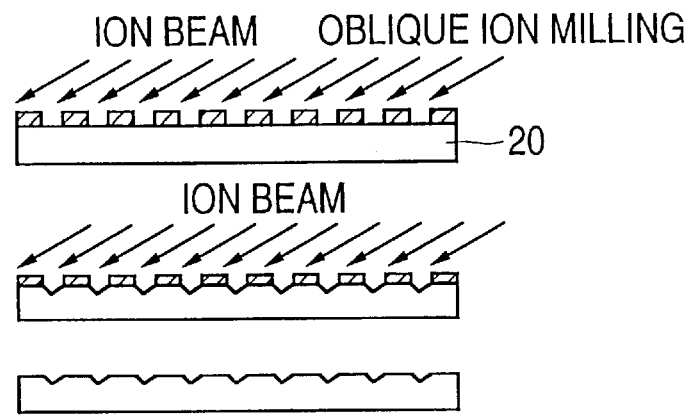
Figure 29D:
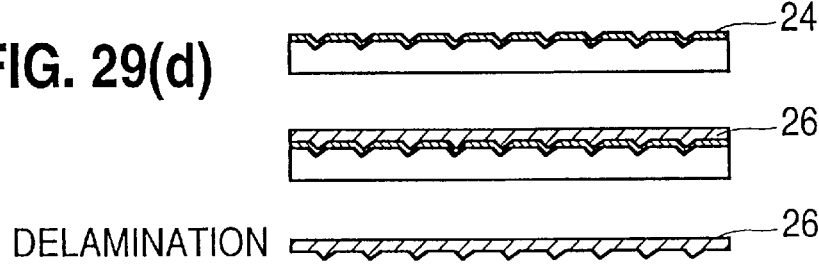
Figure 29D:
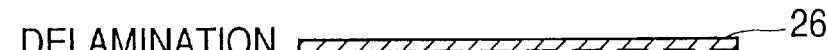
Figure 29E:
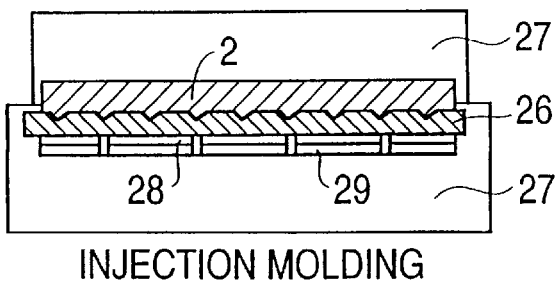

(1) step of forming a photoresist film 21 on a substrate 20, as illustrated in FIG. 29(a), (2) step of disposing a photo mask 22 having a pattern of small convexes on the substrate 20, irradiating with the ultraviolet rays 23 from above the photo mask 22 and developing for thereby forming a template pattern of the small convexes on the substrate 20, as illustrated in FIG. 29(c), (3) step of forming the pattern into a desired section by dry etching, as illustrated in FIG. 29(c), (4) step of forming a plastic molding stamper 26 by forming a metal plating layer 24, as illustrated in FIG. 29(d), and (5) forming the light guide plate 2 through a plastic molding process by using the stamper 26, as illustrated in FIG. 29(e).

With the manufacturing method, the photo mask can be formed in a predetermined pattern by resorting to a dry-etching process, whereon the original form of the dots constituted by small convexes or small concaves can be shaped into desired sectional forms.

Finally, description will be made of a structure of the liquid crystal display device.

Figure 30:
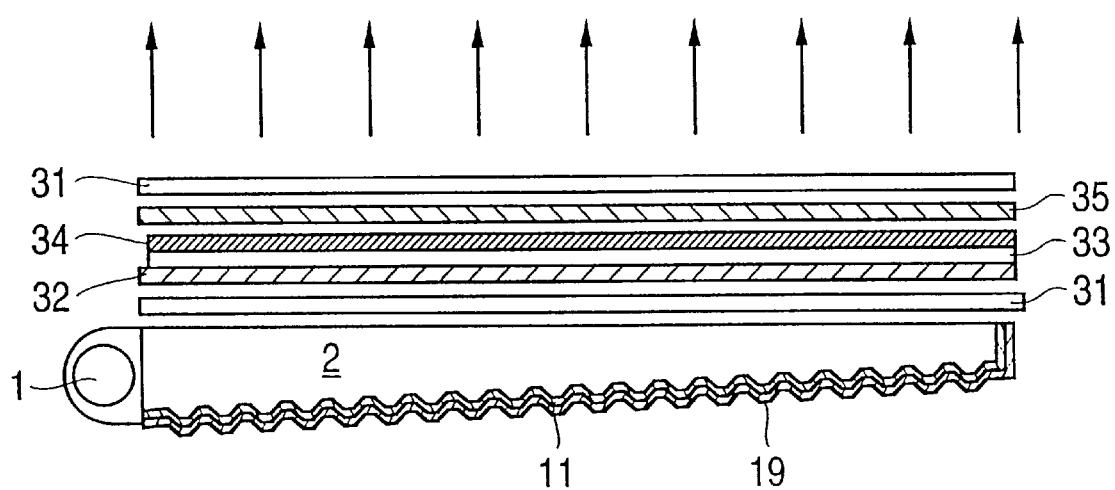
FIG. 30 is a view showing schematically a structure of a liquid crystal display device according to an embodiment of the present invention.

FIG. 30 shows schematically a structure of the liquid crystal display device according to an embodiment of the present invention. In this liquid crystal display device, the backlighting panel is comprised of a light guide plate 2 and a polarizing plate 31, a thin row film transistor array 32, a liquid crystal cell array 33, a common electrode 34, a color filter 35 and a polarizing plate 31 formed sequentially in this order on the light guide plate 2. In this conjunction, it should however be mentioned that the structure of the liquid crystal display device mentioned above is only for the illustrative purpose and that the present invention is never restricted to the structure of liquid crystal display device illustrated in FIG. 30. Many other modifications of the liquid crystal display device inclusive those of the backlighting light guide panel can be conceived by those skilled in the art without departing from the scope and spirit of the present invention.

By way of example, in the liquid crystal display device for the lap-top type personal computers and/or television monitors, a large angle of view field is required. To meet this requirement, a diffusing plate for increasing the angle of view field may be provided at an appropriate position in the structure shown in FIG. 16. Furthermore, as an attempt for enlarging the angle of view field after lighting the liquid crystal cell array 33 with the lighting rays of high directivity, a light-ray diffusing sheet may be provided. To say in another way, the angle of view field can be increased by imparting the light-ray scattering function to the backlighting light guide panel by processing appropriately the light-transmissive layer.

As the light sources which can be employed in the liquid crystal display devices according to the invention, there way be mentioned a cold cathode-discharge tube, a hot cathode-discharge tube, a tungsten lamp, a xenon lamp, a metal halide lamp or the like. However, in the liquid crystal display device according to the invention, it is preferred to employ a cold type light source such as a cold cathode discharge tube.

The liquid crystal device to which the present invention can find application is never restricted to any specific one but can be applied to conventional liquid crystal devices or liquid crystal device panels known heretofore. As the liquid cell arrays to which the invention can find application, there may be mentioned generally twist mnematic, super-twist mnematic, homogenous, thin film transistor or the like type or a liquid crystal cell array of active matrix driving scheme or a simple matrix driving type.

In conjunction with the luminance (or intensity) distribution uniformizing mask (not shown) which can be used as occasion requires for uniformization of luminance distribution can be formed of a sheet of a matrical the light-transmissivity of which can be varied, wherein the luminance uniformizing mask may be disposed at a given or arbitrary position in the light guide plate.

As can now be appreciated from the foregoing description, with the improved structure of the backlighting light guide panel for the liquid crystal display device, the number of components or members constituting the backlighting light guide panel can be considerably decreased when compared with the hitherto known conventional one which requires a large number of constituent parts such as the light source, light guide plate, diffusing sheet, prism sheets, reflecting sheet and others. Consequently, the backlighting light guide panel according to the invention can be manufactured very expensively by using a smaller number of parts with the number of processing steps being decreased while ensuring nevertheless enhancement of luminance as compared with the conventional backlighting light guide panel. Additionally, other problem of the conventional backlighting light guide panel such as occurrence of moire interference, invasion and deposition of dusts between the reflecting sheet and the light guide plate, which gives rise to degradation of the light utilization efficiency and appearance of nonuniformity in the light intensity or luminance distribution can be solved satisfactorily in the backlighting light guide panel according to the invention. Thus, there can be realized the liquid crystal display device which enjoy highly stabilized characteristics, providing thus contribution to technical progress in the relevant industrial field. Additionally, with the method of manufacturing the backlighting light guide panel according to the invention, the backlighting light guide panel which can serve for the multiple functions mentioned previously can easily be fabricated.

What is claimed is:

1. A liquid crystal display device, comprising:

a liquid crystal cell array;

a light guide plate disposed on a rear surface of said liquid crystal cell array; and a light source disposed at a lateral side of said light guide plate, wherein said light guide plate includes:

an incident surface on which light rays emitted from said light source are incident;

a light-transmissive surface through which the incident light rays exit said light guide plate toward said liquid crystal cell array; and a plurality of reflecting slant portions for directing said incident light rays toward said light-transmissive surface, said plurality of reflecting slant portions being constituted by convexes or concaves which are substantially rectangular in plan view and substantially trapezoidal in sectional view.

2. A liquid crystal display device according to claim 1, wherein said reflecting slant portions which are substantially rectangular in plan view have a length of a short side falling within a range of 10 μm to 200 μm.

3. A liquid crystal display device according to claim 2, wherein said reflecting slant portions which are substantially trapezoidal in sectional view have a height or depth falling within a range of 2 to 40 μm.

4. A liquid crystal display device according to claim 1, wherein said reflecting slant portions which are substantially trapezoidal in sectional view have an angle of inclination falling within a range of 35±10°.

5. A liquid crystal display device according to claim 1, wherein said plurality of reflecting slant portions formed in said light guide plate are disposed substantially at random.

6. A liquid crystal display device according to claim 1, wherein said plurality of reflecting slant portions constituted by convexes or concaves which are substantially rectangular in plan view and substantially trapezoidal in sectional view are substantially trapezoidal in sectional views taken in orthogonal directions.

7. A liquid crystal display device comprising:

a liquid crystal cell array;

a light guide plate disposed on a rear surface of said liquid crystal cell array; and a light source disposed at a lateral side of said light guide plate, wherein said light guide plate includes:

an incident surface on which light rays emitted from said light source are incident;

a light-transmissive surface through which the incident light rays exit said light guide plate toward said liquid crystal cell array; and a plurality of reflecting slant portions for directing said incident light rays toward said light-transmissive surface, said plurality of reflecting slant portions being constituted by a corresponding number of convexes or alternatively by a corresponding number of concaves, wherein said reflecting slant portions formed in said light guide plate have an angle of inclination falling within a range of 35±15° relative to a coextensive plane of said light guide plate, and further comprising:

a prism sheet disposed on a top surface of said light guide plate, said prism sheet having a first prism angle of 80 to 88° and a second prism angle of 20 to 40°.

8. A light guide panel for illumination comprising:

a light guide plate substantially of a rectangular form having one lateral side at which a light source is destined to be disposed;

said light guide plate including:

an incident surface on which light rays emitted from said light source are incident;

a light-transmissive surface through which the incident light rays exit said light guide plate; and a plurality of reflecting slant portions for directing said incident light rays toward said light-transmissive surface, said plurality of reflecting slant portions being constituted by a corresponding number of convexes or alternatively by a corresponding number of concaves, wherein said reflecting slant portions formed in said light guide plate have an angle of inclination falling within a range of 35±15° relative to a coextensive plane of said light guide plate, and further comprising:

a prism sheet disposed on a top surface of said light guide plate, said prism sheet having a first prism angle of 80 to 88° and a second prism angle of 20 to 40°.

* * * * *